(12) United States Patent
Waplington et al.

(10) Patent No.: US 11,349,877 B2
(45) Date of Patent: May 31, 2022

(54) SOLUTION MANAGEMENT SYSTEMS AND METHODS FOR ADDRESSING CYBERSECURITY VULNERABILITIES

(71) Applicant: ServiceNow, Inc., Santa Clara, CA (US)

(72) Inventors: Brian James Waplington, San Diego, CA (US); David Victor Barkovic, Kirkland, WA (US); Xuchang Chen, San Francisco, CA (US); Karthika Gajjala, San Diego, CA (US); Giora Tamir, San Diego, CA (US)

(73) Assignee: ServiceNow, Inc., Santa Clara, CA (US)

( * ) Notice: Subject to any disclaimer, the term of this patent is extended or adjusted under 35 U.S.C. 154(b) by 288 days.

(21) Appl. No.: 16/555,693

(22) Filed: Aug. 29, 2019

(65) Prior Publication Data
US 2020/0404022 A1 Dec. 24, 2020

Related U.S. Application Data

(60) Provisional application No. 62/864,370, filed on Jun. 20, 2019.

(51) Int. Cl.
| | |
|---|---|
| *H04L 29/00* | (2006.01) |
| *H04L 9/40* | (2022.01) |
| *G06F 16/22* | (2019.01) |
| *H04L 67/51* | (2022.01) |
| *G06Q 30/06* | (2012.01) |

(52) U.S. Cl.
CPC .............. *H04L 63/20* (2013.01); *G06F 16/22* (2019.01); *H04L 63/1433* (2013.01); *H04L 63/205* (2013.01); *H04L 67/16* (2013.01); *G06Q 30/0641* (2013.01)

(58) Field of Classification Search
CPC ..... H04L 63/20; H04L 67/16; H04L 63/1433; H04L 63/205; H04L 67/10; G06F 16/22; G06Q 30/0641
See application file for complete search history.

(56) References Cited

U.S. PATENT DOCUMENTS

| | | | |
|---|---|---|---|
| 6,816,898 B1 | 11/2004 | Scarpelli | |
| 7,020,706 B2 | 3/2006 | Cates | |
| 7,346,922 B2* | 3/2008 | Miliefsky | ........... H04L 63/0272 726/11 |
| 7,716,353 B2 | 5/2010 | Golovinsky | |
| 7,769,718 B2 | 8/2010 | Murley | |
| 7,925,981 B2 | 4/2011 | Pourheidar | |
| 8,224,683 B2 | 7/2012 | Manos | |

(Continued)

*Primary Examiner* — Don G Zhao
(74) *Attorney, Agent, or Firm* — Fletcher Yoder PC

(57) ABSTRACT

Solution management systems and methods are presently disclosed that enable receiving, compiling, and analyzing vendor solutions, determining the vendor solutions that address a target vulnerability of a client network and/or client devices, determining additional vulnerabilities of the client network and/or client devices that the vendor solutions address, and selecting a vendor solution to remediate the target vulnerability. The presently disclosed systems and methods also enable scoring, risk evaluation, and additional metrics to facilitate determining the vendor solution(s) that have the largest impact and/or benefit to the various vulnerabilities of the client network and/or client devices.

16 Claims, 13 Drawing Sheets

(56) References Cited

U.S. PATENT DOCUMENTS

| | | | |
|---|---|---|---|
| 8,402,127 B2 | 3/2013 | Solin | |
| 8,612,408 B2 | 12/2013 | Trinon | |
| 8,832,652 B2 | 9/2014 | Mueller | |
| 9,065,783 B2 | 6/2015 | Ding | |
| 9,098,322 B2 | 8/2015 | Apte | |
| 9,122,552 B2 | 9/2015 | Whitney | |
| 9,137,110 B1* | 9/2015 | Adogla | H04L 41/145 |
| 9,215,158 B1* | 12/2015 | Adogla | G06F 11/008 |
| 9,317,327 B2 | 4/2016 | Apte | |
| 9,363,252 B2 | 6/2016 | Mueller | |
| 9,535,737 B2 | 1/2017 | Joy | |
| 9,557,969 B2 | 1/2017 | Sharma | |
| 9,619,772 B1* | 4/2017 | Adogla | G06Q 10/0635 |
| 9,645,833 B2 | 5/2017 | Mueller | |
| 9,654,473 B2 | 5/2017 | Miller | |
| 9,766,935 B2 | 9/2017 | Kelkar | |
| 9,792,387 B2 | 10/2017 | George | |
| 9,805,322 B2 | 10/2017 | Kelkar | |
| 9,819,729 B2 | 11/2017 | Moon | |
| 10,887,337 B1* | 1/2021 | Kim | H04L 67/08 |
| 2001/0014150 A1* | 8/2001 | Beebe | H04L 63/0218 379/189 |
| 2003/0126472 A1* | 7/2003 | Banzhof | G06F 21/577 726/25 |
| 2005/0138204 A1* | 6/2005 | Iyer | H04L 63/164 709/242 |
| 2005/0210291 A1* | 9/2005 | Miyawaki | H04L 29/12066 726/5 |
| 2005/0216957 A1* | 9/2005 | Banzhof | H04L 63/0218 726/25 |
| 2006/0053290 A1* | 3/2006 | Randle | G06Q 20/388 713/169 |
| 2006/0101517 A1* | 5/2006 | Banzhof | G06F 21/577 726/25 |
| 2007/0038523 A1* | 2/2007 | Komem | G06Q 20/381 705/26.1 |
| 2007/0124009 A1* | 5/2007 | Bradley | G06Q 10/087 700/99 |
| 2008/0004970 A1* | 1/2008 | Ehrensberger | G06Q 10/101 705/7.32 |
| 2008/0016565 A1* | 1/2008 | Mushing | G06Q 20/24 726/22 |
| 2008/0062167 A1* | 3/2008 | Boggs | G06T 19/00 345/419 |
| 2008/0126794 A1* | 5/2008 | Wang | H04L 63/0823 713/151 |
| 2008/0155647 A1* | 6/2008 | Miyawaki | H04L 63/0227 726/1 |
| 2009/0307753 A1* | 12/2009 | Dupont | H04L 63/0272 726/3 |
| 2010/0125470 A1* | 5/2010 | Chisholm | G06Q 20/04 705/35 |
| 2011/0058208 A1* | 3/2011 | Takahashi | G06F 3/1287 358/1.14 |
| 2012/0266209 A1* | 10/2012 | Gooding | H04L 63/20 726/1 |
| 2012/0278177 A1* | 11/2012 | Bender | G06Q 30/06 705/14.66 |
| 2013/0013512 A1* | 1/2013 | Cloud | G06Q 20/40 705/44 |
| 2013/0291060 A1* | 10/2013 | Moore | G16H 40/63 726/1 |
| 2014/0067675 A1* | 3/2014 | Leyva | G06Q 20/38215 705/44 |
| 2014/0278730 A1* | 9/2014 | Mu | G06Q 10/0635 705/7.28 |
| 2015/0113264 A1* | 4/2015 | Wang | H04L 63/02 713/151 |
| 2015/0169595 A1* | 6/2015 | Zagoudis | G06Q 10/00 707/694 |
| 2015/0363270 A1* | 12/2015 | Hammer | G06F 11/1451 711/162 |
| 2016/0085972 A1* | 3/2016 | Luo | H04L 63/10 713/153 |
| 2016/0366105 A1* | 12/2016 | Smith | H04L 63/0428 |
| 2017/0012876 A1* | 1/2017 | Bamford | H04L 45/04 |
| 2017/0063532 A1* | 3/2017 | Bhattacharyya | G06F 21/76 |
| 2017/0193528 A1* | 7/2017 | Brown | G06F 16/2457 |
| 2017/0236078 A1* | 8/2017 | Rasumov | G06Q 10/0635 705/7.28 |
| 2017/0364908 A1* | 12/2017 | Smith | G06Q 20/023 |
| 2018/0063178 A1* | 3/2018 | Jadhav | H04L 45/74 |
| 2018/0146004 A1* | 5/2018 | Belfiore, Jr | G06F 21/577 |
| 2018/0152506 A1* | 5/2018 | Simo | G06Q 10/101 |
| 2019/0342323 A1* | 11/2019 | Henderson | G06F 16/285 |
| 2020/0042716 A1* | 2/2020 | Belfiore, Jr | H04L 63/1433 |
| 2020/0387544 A1* | 12/2020 | Smith | G06F 16/93 |

* cited by examiner

| ≡ NUMBER | ≡ SUMMARY ▲ | ≡ BULLETIN | ≡ PRODUCT CATEGORIES | ≡ RISK SCORE | ≡ RISK RATING | ≡ ACTIVE VIS | ≡ PERCENT COMPLETE | ≡ DATE PUBLISHED |
|---|---|---|---|---|---|---|---|---|
| VRSOD03302 | CUMULATIVE UPDATE 1 FOR SERVER | FEBRUARY SECURITY UPDATES | SERVER | 70 | 3 - MEDIUM | 85 | 92.69% | DATE 1 |
| VRSOD03304 | CUMULATIVE UPDATE 12 FOR SERVER | FEBRUARY SECURITY UPDATES | SERVER | 70 | 3 - MEDIUM | 85 | 92.69% | DATE 2 |
| VRSOD03303 | CUMULATIVE UPDATE 22 FOR SERVER | FEBRUARY SECURITY UPDATES | SERVER | 70 | 3 - MEDIUM | 85 | 92.69% | DATE 3 |
| VRSOD03286 | DESCRIPTION OF THE SECURITY AND QUALITY ROLLUP FOR FRAMEWORK 2.0 AND 3.0 SERVER (KB 4483457) | FEBRUARY SECURITY UPDATES | DEVELOPER TOOLS | 82 | 2 - HIGH | 3,627 | 20% | DATE 4 |
| VRSOD03282 | DESCRIPTION OF THE SECURITY AND QUALITY ROLLUP FOR FRAMEWORK 3.5 FOR SERVER R2 SP1 (KB 4483459) | FEBRUARY SECURITY UPDATES | DEVELOPER TOOLS | 82 | 2 - HIGH | 3,627 | 20% | DATE 5 |
| VRSOD03276 | DESCRIPTION OF THE SECURITY AND QUALITY ROLLUP FOR FRAMEWORK 3.5 FOR SERVER (KB 4483456) | FEBRUARY SECURITY UPDATES | DEVELOPER TOOLS | 82 | 2 - HIGH | 3,627 | 20% | DATE 6 |
| VRSOD03264 | DESCRIPTION OF THE SECURITY AND QUALITY ROLLUP FOR FRAMEWORK 4.5.2 FOR SERVER R2 SP1 (KB 4483458) | FEBRUARY SECURITY UPDATES | DEVELOPER TOOLS | 82 | 2 - HIGH | 3,627 | 20% | DATE 7 |
| VRSOD03260 | DESCRIPTION OF THE SECURITY AND QUALITY ROLLUP FOR FRAMEWORK 4.5.2 FOR SERVER R2 SP1 AND SERVER (KB 4483455) | FEBRUARY SECURITY UPDATES | DEVELOPER TOOLS | 82 | 2 - HIGH | 3,627 | 20% | DATE 8 |
| VRSOD03281 | DESCRIPTION OF THE SECURITY AND QUALITY ROLLUP FOR FRAMEWORK | FEBRUARY SECURITY | DEVELOPER TOOLS | 82 | 2 - HIGH | 3,627 | 20% | DATE 9 |

FIG. 10

SOLUTION MANAGEMENT SYSTEMS AND METHODS FOR ADDRESSING CYBERSECURITY VULNERABILITIES

CROSS REFERENCE TO RELATED APPLICATIONS

This application claims priority from and the benefit of U.S. Provisional Application Ser. No. 62/864,370, entitled "Solution Management Systems and Methods for Addressing Cybersecurity Vulnerabilities," filed Jun. 20, 2019, which is hereby incorporated by reference in its entirety for all purposes.

This application is related to co-pending U.S. patent application Ser. No. 16/555,760, entitled "Solution Management Systems and Methods for Addressing Cybersecurity Vulnerabilities," and to co-pending U.S. patent application Ser. No. 16/555,823, entitled "Solution Management Systems and Methods for Addressing Cybersecurity Vulnerabilities," which is hereby incorporated by reference in its entirety for all purposes.

BACKGROUND

The present disclosure relates generally to addressing cybersecurity vulnerabilities, and more particularly to organizing, scoring, presenting, and applying solutions to cybersecurity vulnerabilities with efficacy.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Organizations, regardless of size, rely upon access to information technology (IT) and data and services for their continued operation and success. A respective organization's IT infrastructure may have associated hardware resources (e.g. computing devices, load balancers, firewalls, switches, etc.) and software resources (e.g. productivity software, database applications, custom applications, and so forth). Over time, more and more organizations have turned to cloud computing approaches to supplement or enhance their IT infrastructure solutions.

Cloud computing relates to the sharing of computing resources that are generally accessed via the Internet. In particular, a cloud computing infrastructure allows users, such as individuals and/or enterprises, to access a shared pool of computing resources, such as servers, storage devices, networks, applications, and/or other computing based services. By doing so, users are able to access computing resources on demand that are located at remote locations, which resources may be used to perform a variety of computing functions (e.g., storing and/or processing large quantities of computing data). For enterprise and other organization users, cloud computing provides flexibility in accessing cloud computing resources without accruing large up-front costs, such as purchasing expensive network equipment or investing large amounts of time in establishing a private network infrastructure. Instead, by utilizing cloud computing resources, users are able redirect their resources to focus on their enterprise's core functions.

Various components (e.g., computers, routers, devices, pieces of software, database tables, scripts, webpages, pieces of metadata, database instances, server instances, services, and so forth) of, for example, a client network and/or client devices may be targeted by malicious entities and develop cybersecurity vulnerabilities. To address these vulnerabilities, a variety of solutions may be developed. However, searching for the applicable solutions, determining the risks involved in not applying each solution, determining a solution from among those available, and determining the impact of applying each solution on other cybersecurity vulnerabilities, may be a tedious, time-consuming, expensive, and ultimately inefficient process.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Solution management systems and methods (e.g., in the context of a cloud-based platform) are presently disclosed that enable receiving, compiling, and analyzing solutions, determining the solutions that address a target vulnerability of, for example, a client network and/or client devices, determining additional vulnerabilities of the client network and/or client devices that the solutions address, and selecting a solution to address the target vulnerability. The presently disclosed systems and methods also enable scoring, risk evaluation, and additional metrics to gauge the impact and/or efficacy of each solution across the client network and/or client devices.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which:

FIG. 10 is an example user interface that displays a table of vendor solutions, according to embodiments of the present disclosure;

DETAILED DESCRIPTION

Figure 1:
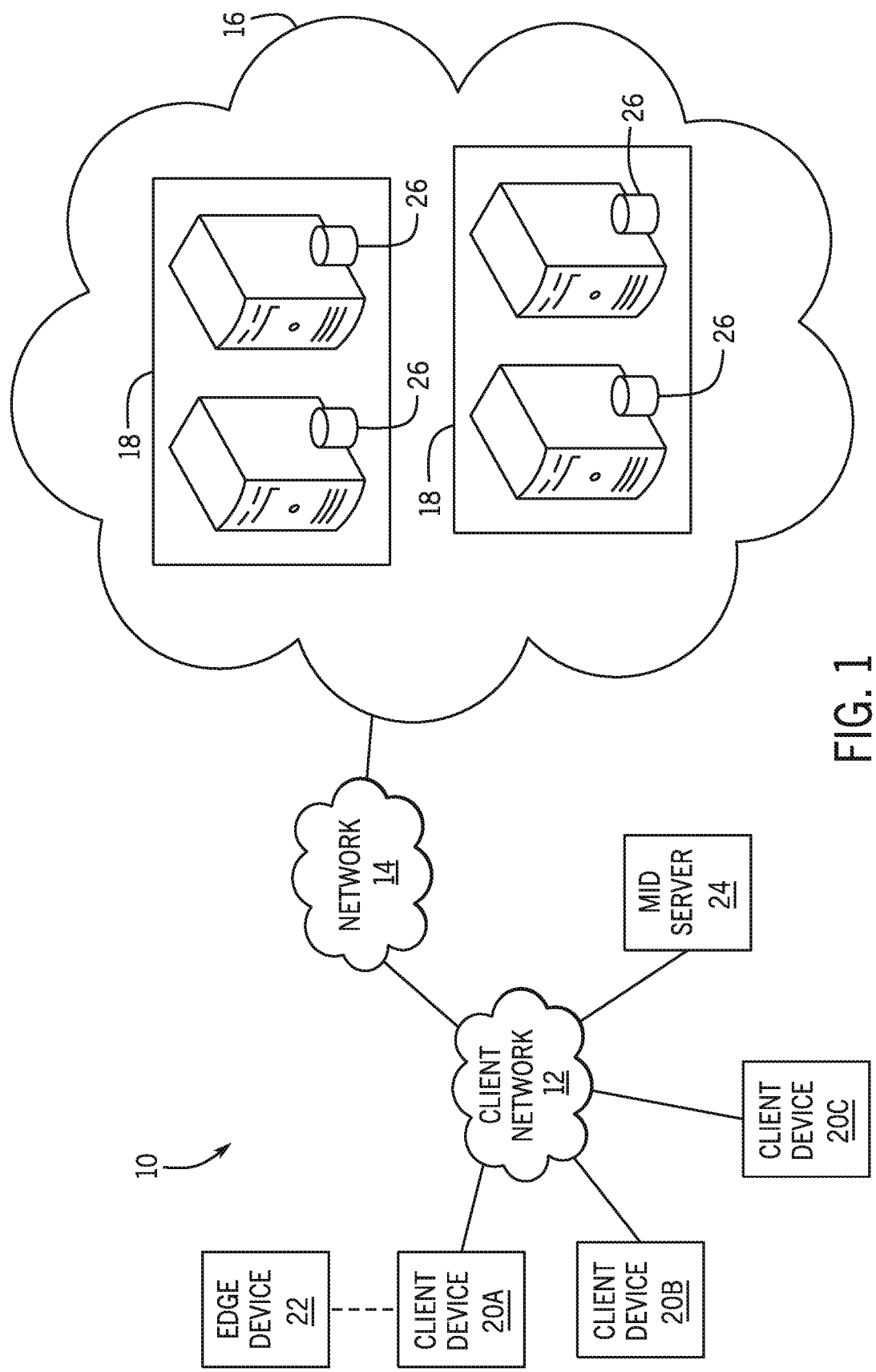
FIG. 1 is a block diagram of an embodiment of a cloud architecture including a client network and client devices in which embodiments of the present disclosure may operate.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and enterprise-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As used herein, the term "computing system" refers to an electronic computing device such as, but not limited to, a single computer, virtual machine, virtual container, host, server, laptop, and/or mobile device, or to a plurality of electronic computing devices working together to perform the function described as being performed on or by the computing system. As used herein, the term "medium" refers to one or more non-transitory, computer-readable physical media that together store the contents described as being stored thereon. Embodiments may include non-volatile secondary storage, read-only memory (ROM), and/or random-access memory (RAM). As used herein, the term "application" refers to one or more computing modules, programs, processes, workloads, threads and/or a set of computing instructions executed by a computing system. Example embodiments of an application include software modules, software objects, software instances and/or other types of executable code. As used herein, the term "configuration item" or "CI" refers to a record for any component (e.g., computer, router, device, piece of software, database table, script, webpage, piece of metadata, database instance, server instance, service, and so forth) in an enterprise network, for which relevant data, such as manufacturer, vendor, location, or similar data, is stored in a database (e.g., a "configuration management database" or CMDB).

Various configuration items of, for example, a client network and/or client devices may be targeted by malicious entities and develop cybersecurity vulnerabilities. The presently disclosed systems and methods include discovering and identifying such vulnerabilities by scanning the client network and/or client devices. To address these vulnerabilities, a variety of solutions may be developed. In many instances, the solutions may be developed by vendors who provide the configuration items (such as operating system vendors, application vendors, service vendors, database vendors, and so on).

The presently disclosed solution management systems and methods (e.g., in the context of a cloud-based platform) enable receiving, compiling, and analyzing the solutions, identifying the solutions that address a target vulnerability of the client network and/or client devices, identifying additional vulnerabilities of the client network and/or client devices that the solutions also address (or otherwise interact with or impact), and selecting a solution to address the target vulnerability. The presently disclosed systems and methods also enable scoring, risk evaluation, and additional metrics to gauge the impact and/or efficacy of each solution across the client network and/or client devices.

In some embodiments, the presently disclosed solution management systems and methods enable users to browse relationships between solutions, publicly known and cataloged vulnerabilities, the vulnerabilities of the client network and/or client devices, the configuration items, groupings of vulnerable items, vendor-specific vulnerabilities of the client network and/or client devices, and so on. These relationships may be browsed from various perspectives, including that of the publicly known and cataloged vulnerabilities, the vulnerabilities of the client network and/or client devices, the solutions, the vulnerable item groups, and the like. Moreover, the users may view metrics, scores, and/or calculations illustrating a solution's impact to the various vulnerabilities and configuration items of the client network and/or client devices.

With the preceding in mind, the following figures relate to various types of generalized system architectures or configurations that may be employed to provide services to an organization in a multi-instance framework and on which the present approaches may be employed. Correspondingly, these system and platform examples may also relate to systems and platforms on which the techniques discussed herein may be implemented or otherwise utilized. Turning now to FIG. 1, a schematic diagram of an embodiment of a cloud computing system 10 where embodiments of the present disclosure may operate, is illustrated. The cloud computing system 10 may include a client network 12, a network 14 (e.g., the Internet), and a cloud-based platform 16. In some implementations, the cloud-based platform 16 may be a configuration management database (CMDB) platform. In one embodiment, the client network 12 may be a local private network, such as local area network (LAN) having a variety of network devices that include, but are not limited to, switches, servers, and routers. In another embodiment, the client network 12 represents an enterprise network that could include one or more LANs, virtual networks, data centers 18, and/or other remote networks. As shown in FIG. 1, the client network 12 is able to connect to one or more client devices 20A, 20B, and 20C so that the client devices are able to communicate with each other and/or with the network hosting the platform 16. The client devices 20 may be computing systems and/or other types of computing devices generally referred to as Internet of Things (IoT) devices that access cloud computing services, for example, via a web browser application or via an edge device 22 that may act as a gateway between the client devices 20 and the platform 16. FIG. 1 also illustrates that the client network 12 includes an administration or managerial device, agent, or server, such as a management, instrumentation, and discovery (MID) server 24 that facilitates communication of data between the network hosting the platform 16, other external applications, data sources, and services, and the client network 12. Although not specifically illustrated in FIG. 1, the client network 12 may also include a connecting network device (e.g., a gateway or router) or a combination of devices that implement a customer firewall or intrusion protection system.

For the illustrated embodiment, FIG. 1 illustrates that client network 12 is coupled to a network 14. The networks 12, 14 may include one or more computing networks, such as other LANs, wide area networks (WAN), the Internet, and/or other remote networks, to transfer data between the client devices 20 and the network hosting the platform 16. Each of the computing networks within network 14 may contain wired and/or wireless programmable devices that operate in the electrical and/or optical domain. For example, network 14 may include wireless networks, such as cellular networks (e.g., Global System for Mobile Communications (GSM) based cellular network), IEEE 802.11 networks, and/or other suitable radio-based networks. The network 14 may also employ any number of network communication protocols, such as Transmission Control Protocol (TCP) and Internet Protocol (IP). Although not explicitly shown in FIG. 1, network 14 may include a variety of network devices, such as servers, routers, network switches, and/or other network hardware devices configured to transport data over the network 14.

In FIG. 1, the network hosting the platform 16 may be a remote network (e.g., a cloud network) that is able to communicate with the client devices 20 via the client network 12 and network 14. The network hosting the platform 16 provides additional computing resources to the client devices 20 and/or the client network 12. For example, by utilizing the network hosting the platform 16, users of the client devices 20 are able to build and execute applications for various enterprise, IT, and/or other organization-related functions. In one embodiment, the network hosting the platform 16 is implemented on the one or more data centers 18, where each data center could correspond to a different geographic location. Each of the data centers 18 includes a plurality of virtual servers 26 (also referred to herein as application nodes, application servers, virtual server instances, application instances, or application server instances), where each virtual server 26 can be implemented on a physical computing system, such as a single electronic computing device (e.g., a single physical hardware server) or across multiple-computing devices (e.g., multiple physical hardware servers). Examples of virtual servers 26 include, but are not limited to a web server (e.g., a unitary Apache installation), an application server (e.g., a unitary JAVA Virtual Machine), and/or a database server (e.g., a unitary relational database management system (RDBMS) catalog).

To utilize computing resources within the platform 16, network operators may choose to configure the data centers 18 using a variety of computing infrastructures. In one embodiment, one or more of the data centers 18 are configured using a multi-tenant cloud architecture, such that one of the server instances 26 handles requests from and serves multiple customers. Data centers 18 with multi-tenant cloud architecture commingle and store data from multiple customers, where multiple customer instances are assigned to one of the virtual servers 26. In a multi-tenant cloud architecture, the particular virtual server 26 distinguishes between and segregates data and other information of the various customers. For example, a multi-tenant cloud architecture could assign a particular identifier for each customer in order to identify and segregate the data from each customer. Generally, implementing a multi-tenant cloud architecture may suffer from various drawbacks, such as a failure of a particular one of the server instances 26 causing outages for all customers allocated to the particular server instance.

In another embodiment, one or more of the data centers 18 are configured using a multi-instance cloud architecture to provide every customer its own unique customer instance or instances. For example, a multi-instance cloud architecture could provide each customer instance with its own dedicated application server(s) and dedicated database server(s). In other examples, the multi-instance cloud architecture could deploy a single physical or virtual server 26 and/or other combinations of physical and/or virtual servers 26, such as one or more dedicated web servers, one or more dedicated application servers, and one or more database servers, for each customer instance. In a multi-instance cloud architecture, multiple customer instances could be installed on one or more respective hardware servers, where each customer instance is allocated certain portions of the physical server resources, such as computing memory, storage, and processing power. By doing so, each customer instance has its own unique software stack that provides the benefit of data isolation, relatively less downtime for customers to access the platform 16, and customer-driven upgrade schedules. An example of implementing a customer instance within a multi-instance cloud architecture will be discussed in more detail below with reference to FIG. 2.

Figure 2:
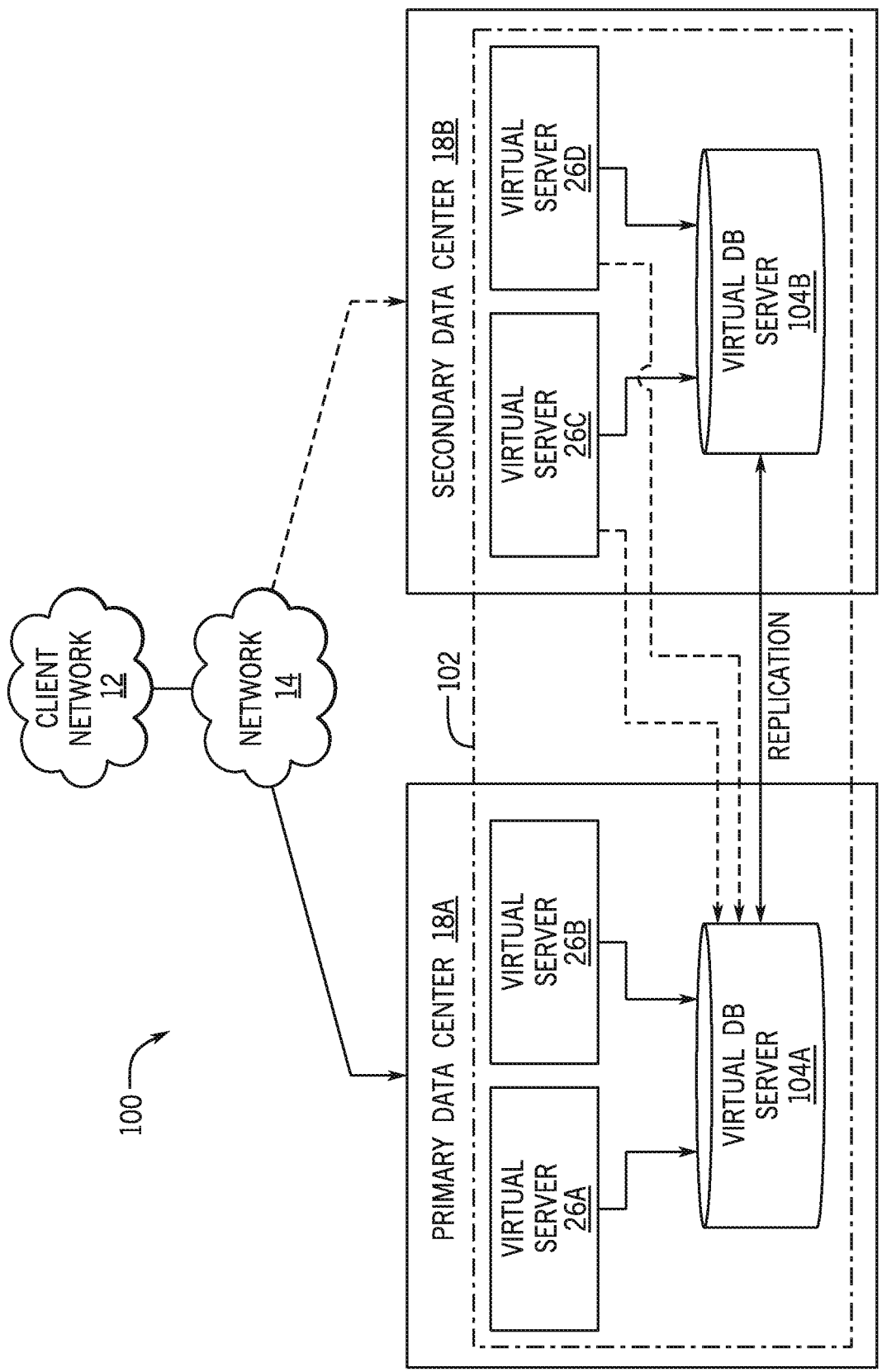
FIG. 2 is a schematic diagram of an embodiment of a multi-instance cloud architecture including a client instance in which embodiments of the present disclosure may operate.

FIG. 2 is a schematic diagram of an embodiment of a multi-instance cloud architecture 100 where embodiments of the present disclosure may operate. FIG. 2 illustrates that the multi-instance cloud architecture 100 includes the client network 12 and the network 14 that connect to two (e.g., paired) data centers 18A and 18B that may be geographically separated from one another and provide data replication and/or failover capabilities. Using FIG. 2 as an example, network environment and service provider cloud infrastructure client instance 102 (also referred to herein as a client instance 102) is associated with (e.g., supported and enabled by) dedicated virtual servers (e.g., virtual servers 26A, 26B, 26C, and 26D) and dedicated database servers (e.g., virtual database servers 104A and 104B). Stated another way, the virtual servers 26A-26D and virtual database servers 104A and 104B are not shared with other client instances and are specific to the respective client instance 102. In the depicted example, to facilitate availability of the client instance 102, the virtual servers 26A-26D and virtual database servers 104A and 104B are allocated to two different data centers 18A and 18B so that one of the data centers 18 acts as a backup data center. Other embodiments of the multi-instance cloud architecture 100 could include other types of dedicated virtual servers, such as a web server. For example, the client instance 102 could be associated with (e.g., supported and enabled by) the dedicated virtual servers 26A-26D, dedicated virtual database servers 104A and 104B, and additional dedicated virtual web servers (not shown in FIG. 2).

Although FIGS. 1 and 2 illustrate specific embodiments of a cloud computing system 10 and a multi-instance cloud architecture 100, respectively, the disclosure is not limited to the specific embodiments illustrated in FIGS. 1 and 2. For instance, although FIG. 1 illustrates that the platform 16 is implemented using data centers, other embodiments of the platform 16 are not limited to data centers and can utilize other types of remote network infrastructures. Moreover, other embodiments of the present disclosure may combine one or more different virtual servers into a single virtual server or, conversely, perform operations attributed to a single virtual server using multiple virtual servers. For instance, using FIG. 2 as an example, the virtual servers 26A, 26B, 26C, 26D and virtual database servers 104A, 104B may be combined into a single virtual server. Moreover, the present approaches may be implemented in other architectures or configurations, including, but not limited to, multi-tenant architectures, generalized client/server implementations, and/or even on a single physical processor-based device configured to perform some or all of the operations discussed herein. Similarly, though virtual servers or machines may be referenced to facilitate discussion of an implementation, physical servers may instead be employed as appropriate. The use and discussion of FIGS. 1 and 2 are only examples to facilitate ease of description and explanation and are not intended to limit the disclosure to the specific examples illustrated therein.

As may be appreciated, the respective architectures and frameworks discussed with respect to FIGS. 1 and 2 incorporate computing systems of various types (e.g., servers, workstations, client devices, laptops, tablet computers, cellular telephones, and so forth) throughout. For the sake of completeness, a brief, high level overview of components typically found in such systems is provided. As may be appreciated, the present overview is intended to merely provide a high-level, generalized view of components typical in such computing systems and should not be viewed as limiting in terms of components discussed or omitted from discussion.

Figure 3:
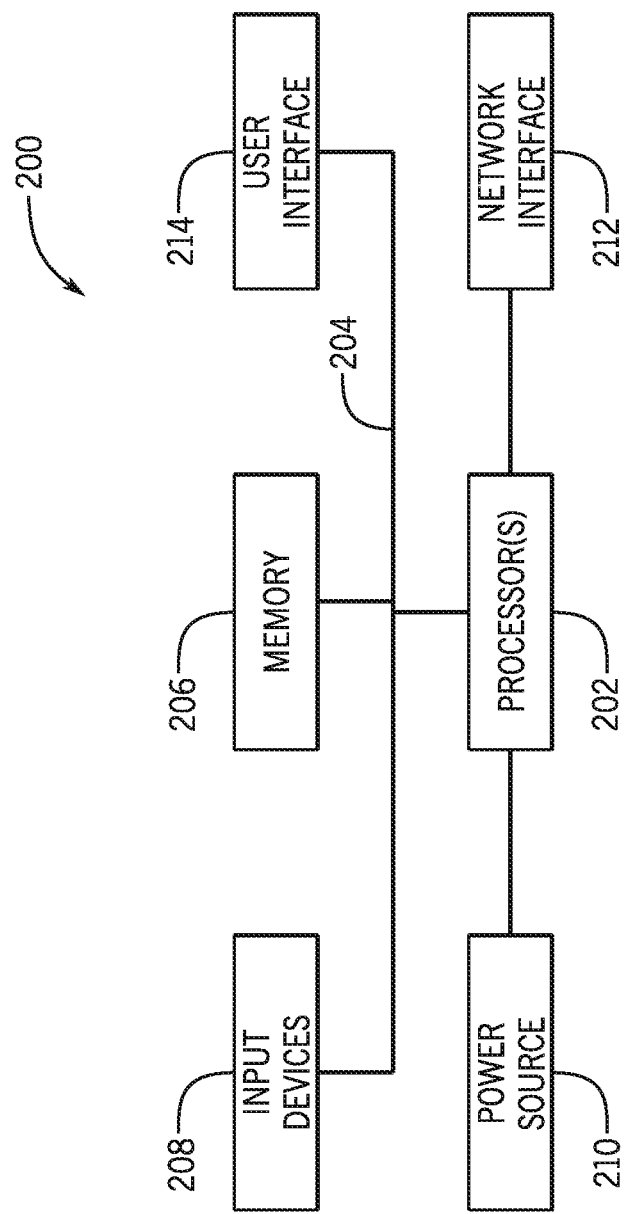
FIG. 3 is a block diagram of a computing device utilized in a computing system that may be present in FIG. 1 or 2, in accordance with aspects of the present disclosure.

By way of background, it may be appreciated that the present approach may be implemented using one or more processor-based systems such as shown in FIG. 3. Likewise, applications and/or databases utilized in the present approach may be stored, employed, and/or maintained on such processor-based systems. As may be appreciated, such systems as shown in FIG. 3 may be present in a distributed computing environment, a networked environment, or other multi-computer platform or architecture. Likewise, systems such as that shown in FIG. 3, may be used in supporting or communicating with one or more virtual environments or computational instances on which the present approach may be implemented.

With this in mind, an example computer system may include some or all of the computer components depicted in FIG. 3. FIG. 3 generally illustrates a block diagram of example components of a computing system 200 and their potential interconnections or communication paths, such as along one or more busses. As illustrated, the computing system 200 may include various hardware components such as, but not limited to, one or more processors 202, one or more busses 204, memory 206, input devices 208, a power source 210, a network interface 212, a user interface 214, and/or other computer components useful in performing the functions described herein.

The one or more processors 202 may include one or more microprocessors capable of performing instructions stored in the memory 206. In some embodiments, the instructions may be pipelined from execution stacks of each process in the memory 206 and stored in an instruction cache of the one or more processors 202 to be processed more quickly and efficiently. Additionally or alternatively, the one or more processors 202 may include application-specific integrated circuits (ASICs), field-programmable gate arrays (FPGAs), and/or other devices designed to perform some or all of the functions discussed herein without calling instructions from the memory 206.

With respect to other components, the one or more busses 204 include suitable electrical channels to provide data and/or power between the various components of the computing system 200. The memory 206 may include any tangible, non-transitory, and computer-readable storage media. Although shown as a single block in FIG. 3, the memory 206 can be implemented using multiple physical units of the same or different types in one or more physical locations. The input devices 208 correspond to structures to input data and/or commands to the one or more processors 202. For example, the input devices 208 may include a mouse, touchpad, touchscreen, keyboard and the like. The power source 210 can be any suitable source for power of the various components of the computing device 200, such as line power and/or a battery source. The network interface 212 includes one or more transceivers capable of communicating with other devices over one or more networks (e.g., a communication channel). The network interface 212 may provide a wired network interface, a wireless network interface, an optical interface, a quantum network interface, and so on. A user interface 214 may include a display that is configured to display text or images transferred to it from the one or more processors 202. In addition and/or alternative to the display, the user interface 214 may include other devices for interfacing with a user, such as lights (e.g., LEDs), speakers, and the like.

Figure 4:
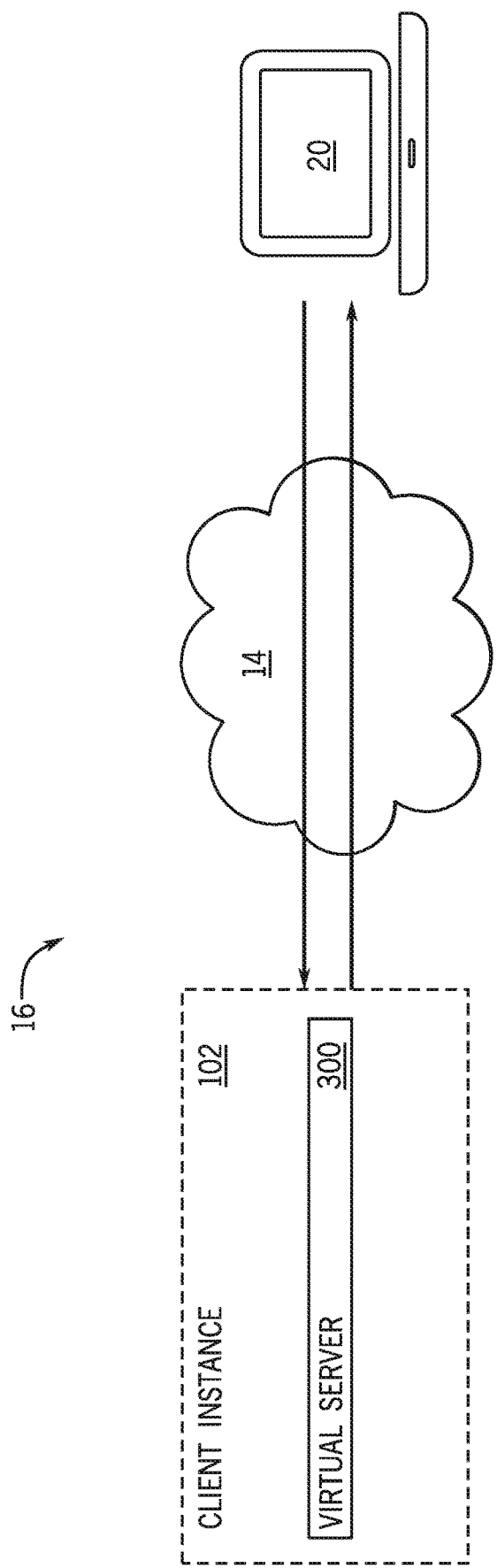
FIG. 4 is a block diagram illustrating an embodiment in which a virtual server supports and enables the client instance of FIG. 2, in accordance with aspects of the present disclosure.

FIG. 4 is a block diagram illustrating an embodiment in which a virtual server 300 supports and enables the client instance 102, according to one or more disclosed embodiments. More specifically, FIG. 4 illustrates an example of a portion of a service provider cloud infrastructure, including the cloud-based platform 16 discussed above. The cloud-based platform 16 is connected to a client device 20 via the network 14 to provide a user interface to network applications executing within the client instance 102 (e.g., via a web browser running on the client device 20). Client instance 102 is supported by virtual servers 26 similar to those explained with respect to FIG. 2, and is illustrated here to show support for the disclosed functionality described herein within the client instance 102. Cloud provider infrastructures are generally configured to support a plurality of end-user devices, such as client device(s) 20, concurrently, wherein each end-user device is in communication with the single client instance 102. Also, cloud provider infrastructures may be configured to support any number of client instances, such as client instance 102, concurrently, with each of the instances in communication with one or more end-user devices. As mentioned above, an end-user may also interface with client instance 102 using an application that is executed within a web browser.

Figure 5:
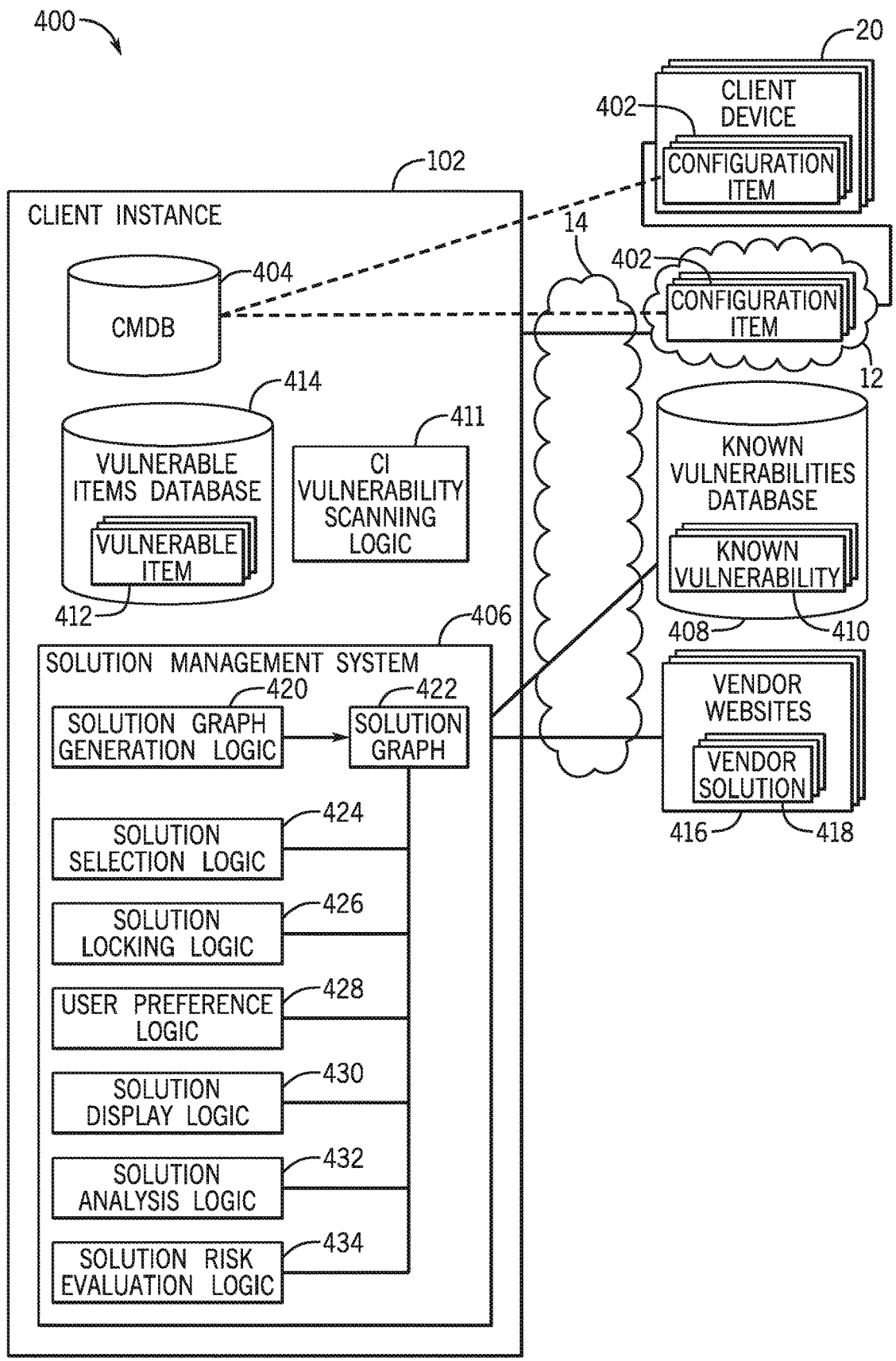
FIG. 5 is a block diagram of a system that manages configuration items, vulnerabilities, and vendor solutions of the client network and/or client devices of FIG. 1, according to embodiments of the present disclosure.

With the preceding in mind, FIG. 5 is a block diagram of a system 400 that manages configuration items, vulnerabilities, and vendor solutions of the client network 12 and/or client devices 20, according to embodiments of the present disclosure. The system 400 may include a client network 12 and/or client devices 20 having one or more configuration items 402. The configuration items 402 may include physical entities (e.g., computers, routers, or other devices), logical entities (e.g., database instances, server instances, or other instances), and/or conceptual entities (e.g., requisition services, migration services, or other services). A configuration management database (CMDB) 404 may be used to manage the configuration items 402 by storing configurations, attributes, descriptions, and/or any other suitable information associated with the configuration items 402.

The system 400 may include the client instance 102, which may implement a solution management system 406 that is communicatively coupled to the CMDB 404 and may receive information about the configuration items 402 of the client network 12 and/or client devices 20 from the CMDB 404. The solution management system 406 may communicatively couple to a known vulnerabilities database 408 via, for example, the network 14. The known vulnerabilities database 408 may include a listing of cybersecurity vulnerabilities 410 and be maintained by third parties. For example, the known vulnerabilities database 408 may be part of the Common Vulnerabilities and Exposures (CVE) system that provides a reference-method for publicly known information-security vulnerabilities and exposures.

The solution management system 406 may also be communicatively coupled to configuration item vulnerability scanning logic 411, which may scan the configuration items 402 of the client network 12 and/or client devices 20 and determine the configuration items 402 that are associated with and/or have known vulnerabilities 410 (which may be referred to as "vulnerable items" 412). In some cases, the configuration item vulnerability scanning logic 411 may be predictive in nature. For example, the configuration item vulnerability scanning logic 411 may determine software applications that a configuration item 402 has installed, and predict that the configuration item 402 has vulnerabilities 410 corresponding to the installed software applications. In some embodiments, the configuration item vulnerability scanning logic 411 may be part of the solution management system 406, while in other embodiments, as illustrated, the configuration item vulnerability scanning logic 411 may be external to the solution management system 406. For example, the configuration item vulnerability scanning logic 411 may be provided by a third party software vendor. The vulnerable items 412 may be stored in a vulnerable items database 414. The configuration item vulnerability scanning logic 411 may periodically (e.g., daily, every other day, weekly, or any other suitable time period) scan the client network 12 and/or client devices 20 for vulnerable items 412, though this may be configurable (e.g., updates may occur based on user initiation or any other suitable triggering event). Additionally, portions of vulnerability scanning logic 411 may also exist in/on the client network 12 and client devices 20. For example, the portion of the vulnerability scanning logic 411 in the client instance 102 may communicate or couple with scanning results over the network 14.

The solution management system 406 may also communicatively couple to various vendor websites (or other sites or repositories) 416 via the network 14 that provide vendor solutions 418 to the known vulnerabilities listed in the known vulnerabilities database 408. It should be understood that further references to vendor websites 416 include, without limitation, web application platform interfaces, XML and/or JSON feeds, data warehouses, or any other web accessible data services. The vendors may be the developers and/or providers of software, such as operating systems or applications that are executed by the client network 12 and/or client devices 20. The vendor solutions 418 may be in the form of patches, workarounds, mitigation steps, or any other suitable guidance that remediate (e.g., fix, solve, patch, or otherwise address) the known vulnerabilities. As an example, one vendor website 416 may be maintained by the Microsoft® Security Response Center, which may provide vendor solutions 418 to known vulnerabilities identified by the CVE system.

Conventional approaches typically include users manually searching for vendor solutions 418 to the vulnerable items 412, determining the risks involved in not implementing each vendor solution 418, determining a suitable vendor solution 418, and determining the impact of applying each vendor solution 418 on other cybersecurity vulnerabilities. Such approaches are often tedious, time-consuming, expensive, and inefficient. For example, while determining the appropriate vendor solution 418 to apply to a single vulnerable item 412 may be a simple exercise, vendor solutions 418 may have far-reaching consequences when considering a platform or enterprise level system, such as the client network 12 and/or client devices 20. This is because multiple vendor solutions 418 may remediate a vulnerable item 412, and each vendor solution 418 may span or affect multiple software applications, software versions, and/or operating systems (each of which may be developed by one or more vendors).

The solution management system 406 may include solution graph generation logic 420 that generates a solution graph or tree 422 which illustrates or conceptualizes relationships between the vendor solutions 418 that apply to the vulnerabilities 410 determined in the client network 12 and/or client devices 20 (realized in the form of vulnerable items 412). In particular, the solution graph generation logic 420 may generate the solution graph 422 based on solution supersedence and vulnerability inheritance. Supersedence refers to a first vendor solution 418 superseding a second vendor solution 418, such that the first vendor solution 418 remediates at least the same vulnerabilities 410 as the second vendor solution 418 (and possibly more vulnerabilities 410). This may occur because, for example, the second vendor solution 418 may be a software patch, and the first vendor solution 418 may be a newer revision of the software patch. As another example, the second vendor solution 418 may be a software patch that remediates a single vulnerable item 412, and a vendor included or "rolled up" the second vendor solution 418 into the first vendor solution 418, which remediates multiple vulnerable items 412 including the single vulnerable item 412. In the case where there is supersedence, a vendor may provide a supersedence (or precedence) "link" stating that the first vendor solution 418 supersedes the second vendor solution 418 (or that the second vendor solution 418 supersedes the first vendor solution 418).

Figure 6:
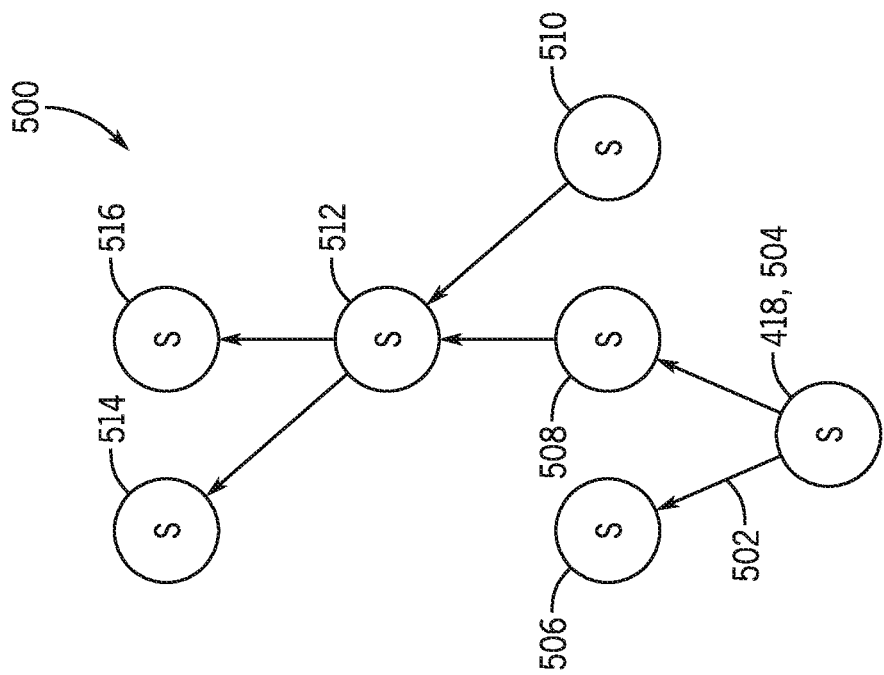
FIG. 6 is an example solution graph illustrating superseding vendor solutions and the highest supersedence solutions, according to embodiments of the present disclosure.

For example, FIG. 6 is an example solution graph 500 illustrating superseding vendor solutions, according to embodiments of the present disclosure. All the vendor solutions 418 in the solution graph 500 may remediate a certain vulnerable item 412. The arrows 502 point to superseding vendor solutions. For example, a vendor solution 504 may not supersede another vendor solution, as the vendor solution 504 does not have an arrow 502 pointing at it. However, the vendor solution 504 is superseded by two other vendor solutions 506, 508, as two arrows 502 point from it to the other two vendor solutions 506, 508. As mentioned above, the two vendor solutions 506, 508 may supersede the vendor solution 504 because, for example, the vendor solutions 506, 508 may be a newer revision of a software patch represented by the vendor solution 504, or the vendor solution 504 may be rolled up into the vendor solutions 506, 508.

The solution graph 500 may include a variety of pathing, such as forking (e.g., from vendor solution 504 to the two vendor solutions 506, 508), converging (e.g., from vendor solutions 508, 510 to vendor solution 512), branching, and so on. In the example solution graph 500, three vendor solutions 506, 514, 516 have highest supersedence in that each of the vendor solutions 506, 514, 516 are not superseded by another vendor solution.

While the solution graph generation logic 420 may allow pathing to diverge from a single first vendor solution and eventually converge to a single second vendor solution, in some embodiments, the solution graph generation logic 420 may "prune" or modify the pathing of the solution graph 500 to ensure that the solution graph 500 is directional such that the solution graph 500 may be walked or traveled from any vendor solution to a vendor solution that is not superseded (e.g., a vendor solution having highest supersedence 506, 514, 516 or "leaf node", wherein each vendor solution of the solution graph 500 is a node). That is, the solution graph generation logic 420 may ensure that there are only directional paths, and thus no cyclical paths, in the solution graph 500.

For example, the solution graph generation logic 420 may not allow cyclical pathing where supersedence passes through and returns to a single vendor solution, as this may prevent determination of a solution due to endless traveling in the cyclical path or loop. If such a relationship is encountered, the solution graph generation logic 420 may break the path (e.g., as represented by an arrow 502) between two vendor solutions at which the cyclical path is created. The solution graph generation logic 420 may also ensure that superseding vendor solutions (e.g., upstream of where the path is broken) not reference the vendor solution at which the path is broken, and if so, the solution graph generation logic 420 may ignore or not map the relationship to the vendor solution.

While it may appear that implementing superseding vendor solutions should be favored to implementing vendor solutions that are not superseded, this is not always the case. For example, a vendor solution that is superseded may nevertheless be favored relative to a superseding vendor solution because it has a more beneficial impact on the client network 12 and/or client devices 20, exposes the client network 12 and/or client devices 20 to less risk, is less costly to implement, takes less time to implement, is less complicated to implement, and so on. As such, despite determining a favored vendor solution based on supersedence, in some embodiments, the client instance 102 may nevertheless enable selection of other vendor solutions.

Figure 7:
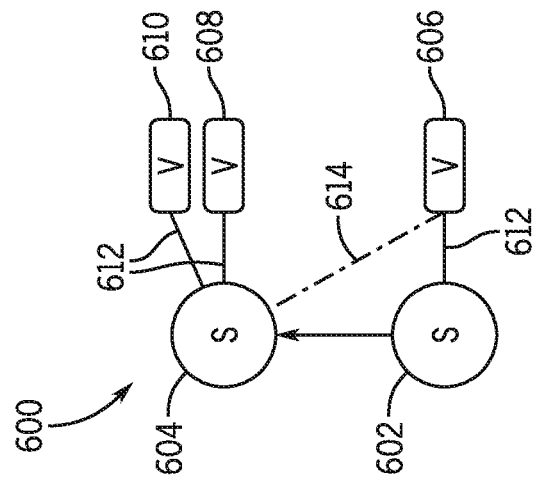
FIG. 7 is an example solution graph illustrating vulnerabilities that are remediated by vendor solutions, as well as inherited vulnerabilities that are remediated by superseding vendor solutions, according to embodiments of the present disclosure.

To facilitate accurate evaluation of vendor solutions 418, the solution graph generation logic 420 may also illustrate or conceptualize vulnerabilities that are remediated by the solutions in the solution graph, as well as vulnerability inheritance. Inheritance refers to the ability of a superseding vendor solution remediating those vulnerabilities that its preceding vendor solution(s) remediate. For example, FIG. 7 is an example solution graph 600 illustrating the vulnerabilities that are remediated by vendor solutions, as well as those inherited vulnerabilities that are remediated by superseding vendor solutions, according to embodiments of the present disclosure. As illustrated, vendor solution 602 is superseded by vendor solution 604. Vendor solution 602 remediates vulnerability 606, and vendor solution 604 remediates vulnerabilities 608, 610, as indicated by the solid lines 612. The solution graph 600 also indicates the concept of vulnerability inheritance with respect to superseding vendor solution 604 via the dashed line 614, which illustrates that, because vendor solution 604 supersedes vendor solution 602, which remediates vulnerability 606, vendor solution 604 also remediates vulnerability 606.

Figure 8:
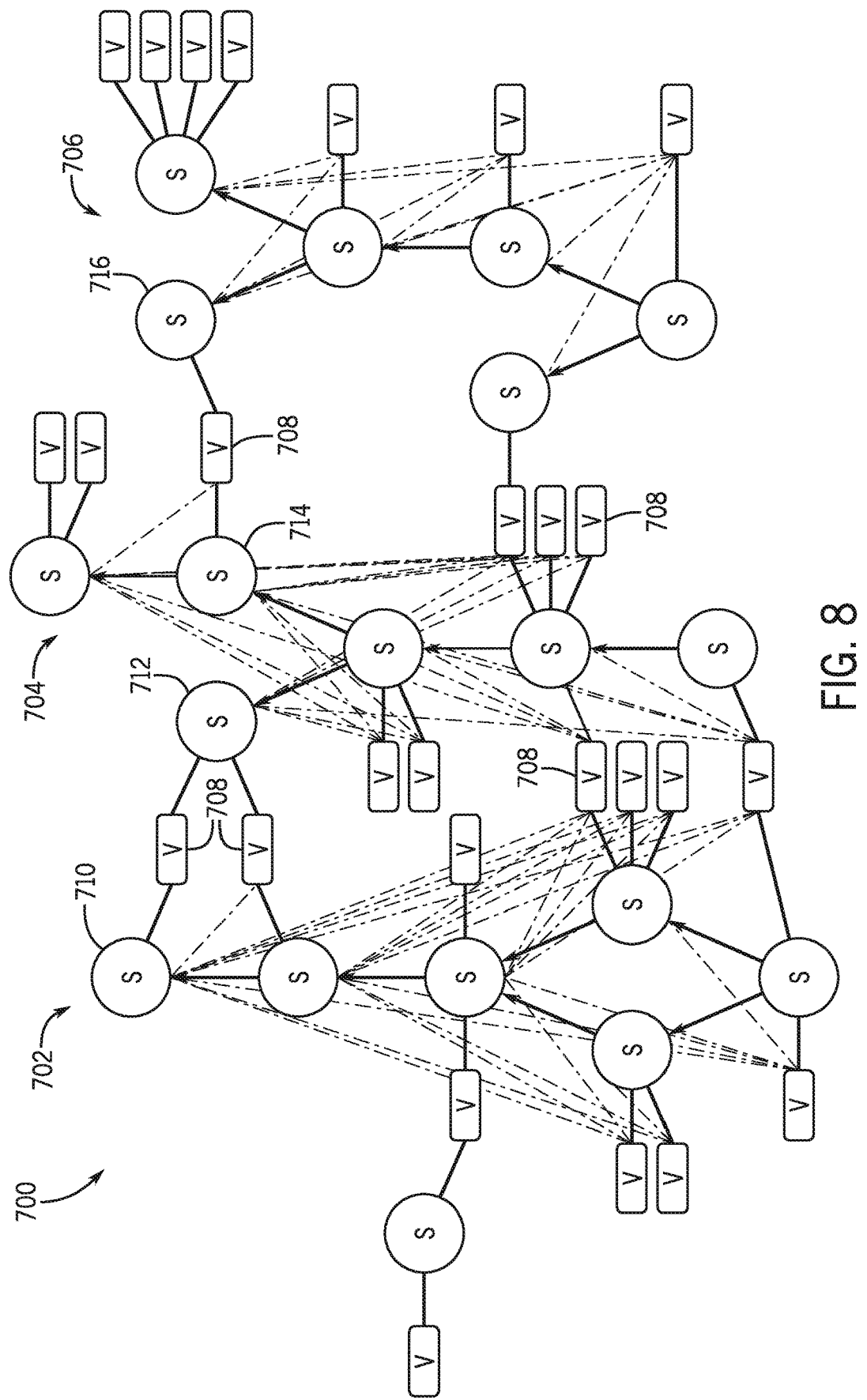
FIG. 8 is an example solution graph that includes multiple solution trees or subgraphs that are connected to one another via shared vulnerabilities, according to embodiments of the present disclosure.

It should be understood that the solution graphs 500, 600 in FIGS. 6-7 are examples used for explanatory purposes, and that, in practice, solution graphs may be much more complex due to having many more solutions, vulnerabilities, and relationships. Additionally, it should be understood that each vulnerability (indicated as "V") and each solution (indicated as "S") illustrated in the solution graphs of FIGS. 6-9 and 11 represent a distinct vulnerability, and not the same vulnerability or solution appearing in multiple places in the respective solution graph. Moreover, more metrics or data than that shown in FIGS. 6-7 may be used and integrated in order to score, rate the impact of, and/or determine vendor solution preference. As an example, FIG. 8 is an example solution graph 700 that includes multiple solution trees or subgraphs 702, 704, 706 that are connected to one another via shared vulnerabilities 708, according to embodiments of the present disclosure. That is, the tree 702 includes one or more solutions (e.g., 710) that remediate a vulnerability 708 that is also remediated by one or more solutions (e.g., 712) of the tree 704. Similarly, the tree 704 includes one or more solutions (e.g., 714) that remediate a vulnerability 708 that is also remediated by one or more solutions (e.g., 716) of the tree 706.

There may also be segregation or optimization of data based on, for example, sources of the data or timing of the availability of the data. For instance, in one embodiment, vendor solutions may be segregated by vendor, such that, if a first vendor makes a first solution available, and a second vendor makes a second solution available, the solution graph generation logic 420 may not allow supersedence between the two solutions because the solutions come from different vendors. In another embodiment, when new or updated solutions are received by the solution management system 406 from the vendor websites 416, the solution graph generation logic 420 may only update vendor solutions, vulnerabilities, vulnerable items, and/or vulnerable item groups that are associated with the new or updated solutions, while ignoring or not analyzing the remainder of the vendor solutions, vulnerabilities, vulnerable items, and/or vulnerable item groups that were not changed. Thus, any vendor solution metrics, scores, ratings, solution preferences, and so forth, associated with the remaining vendor solutions, vulnerabilities, vulnerable items, and/or vulnerable item groups may remain unaffected, and the process of updating the solution graph may be more efficient.

Turning back to FIG. 5, the solution management system 406 may include solution selection logic 424 that may automatically determine a vendor solution to recommend or implement. In particular, for a given vulnerability 410 or vulnerable item 412 (e.g., which may be selected by a user), the solution selection logic 424 may determine each vendor solution 418 in the solution graph 422 that remediates the given vulnerability 410 or vulnerable item 412. The solution selection logic 424 may then determine a set of potential vendor solutions, e.g., the one or more highest supersedence vendor solutions for each determined vendor solution. If the solution selection logic 424 determines a single highest supersedence vendor solution for the set of potential vendor solutions, then the solution selection logic 424 may return or output the single highest supersedence vendor solution (e.g., the favored or suggested vendor solution). If the solution selection logic 424 determines more than one highest supersedence vendor solution for all the determined vendor solutions, then the solution selection logic 424 may not return or output a vendor solution, as it may be ambiguous what the suggested vendor solution is. In some embodiments, though, the solution selection logic 424 may return all the determined potential vendor solutions that include those that are the highest supersedence vendor solutions (e.g., based on a percentage or other threshold cutoff), or a subset of the determined highest supersedence vendor solutions based on any suitable metrics, user preferences, filters, and the like. Additionally, if the solution selection logic 424 determines that there is not a favored vendor solution due to updated or new data from a solution import from the vendor websites 416, and the solution selection logic 424 had previously determined that there was a favored vendor solution based on older data, then the solution selection logic 424 may remove or delete the previously determined favored vendor solution for the vulnerability, vulnerable item, and/or the vulnerable item groups so that information may stay current.

Figure 9:
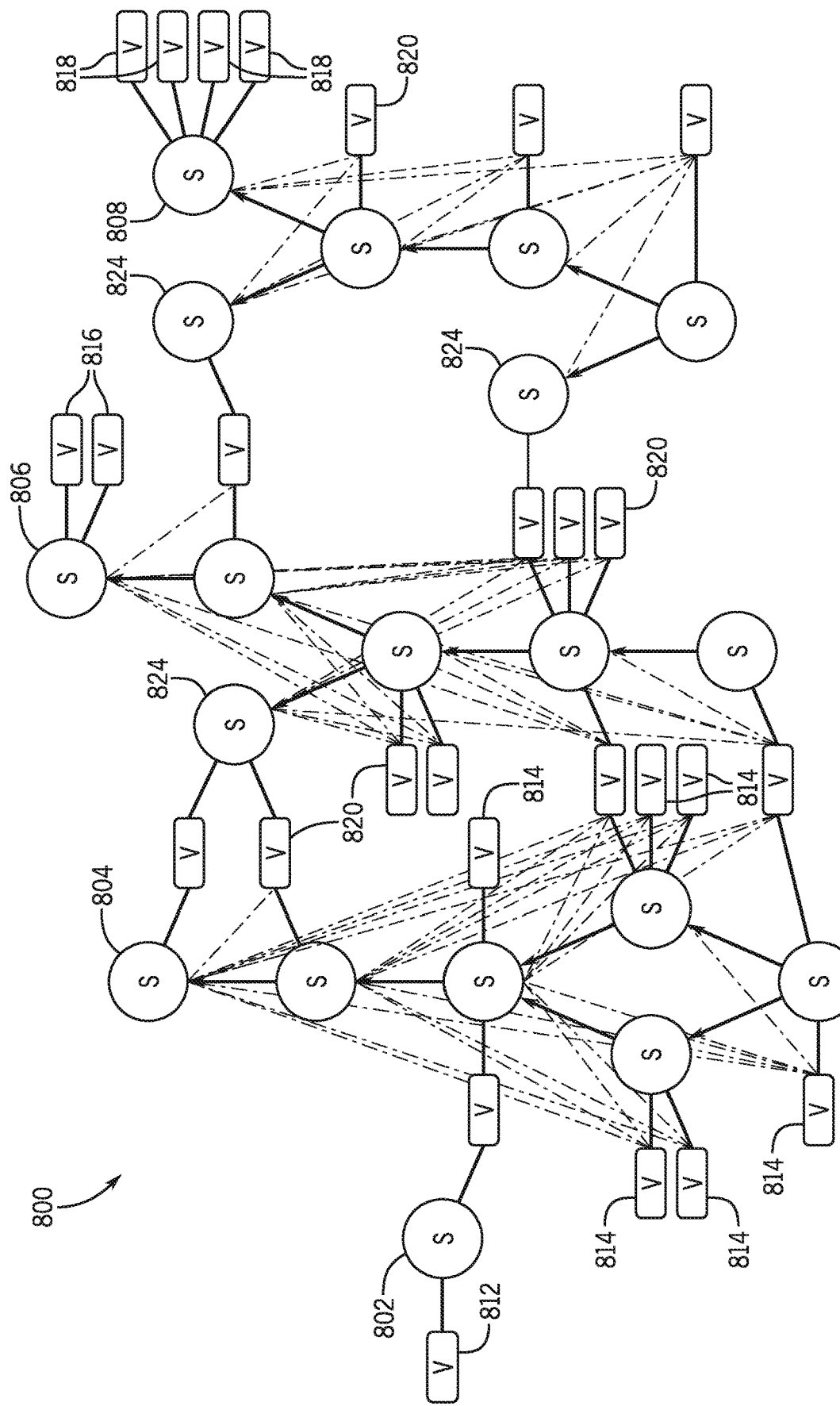
FIG. 9 is an example solution graph that illustrates determining suitable vendor solutions, according to embodiments of the present disclosure.

FIG. 9 is an example solution graph 800 that illustrates determining suitable vendor solutions, according to embodiments of the present disclosure. In particular, the solution selection logic 424 may determine a suitable or favored vendor solution by starting at a given or selected vulnerability 410, and determining all the vendor solutions 418 that remediate that vulnerability 410. For each of the vendor solutions 418 that remediate the vulnerability 410, the solution selection logic 424 follows the direction of supersedence arrows connected to a respective vendor solution 418 (and does not follow the paths to any vulnerabilities 410). If following these paths of each of the vendor solutions 418 that remediate the vulnerability 410 leads to the same, single vendor solution 418 (e.g., the same, single, highest supersedence vendor solution), that vendor solution 418 is the suggested or favored vendor solution.

For example, as illustrated, the solution graph 800 illustrates multiple favored vendor solutions 802, 804, 806, 808 for respective given vulnerabilities 812, 814, 816, 818 because the solution selection logic 424 may identify, assign, or output each of the multiple favored vendor solutions 802, 804, 806, 808 as the same, single highest supersedence vendor solution for the respective given vulnerabilities 812, 814, 816, 818. However, for each of the other illustrated vulnerabilities (e.g., 820), there are more than one highest supersedence vendor solutions (e.g., 824). As such, the solution selection logic 424 may not identify, assign, or output a favored or suggested vendor solution.

Moreover, user preferences may modify the algorithmic determination of the vendor solution. That is, referring back to FIG. 5, in some cases, a user may favor one or more specific vendor solutions 418 for one or more vulnerabilities 410 and/or vulnerable items 412. This may be due to policy constraints, because the vendor solution 418 is bundled with other patches that the user does not desire to apply, and so on. As such, the solution management system 406 may include solution locking logic 426 that enables a user to "lock" or force a vendor solution 418 to remediate a given vulnerability 410 or vulnerable item 412. In such a case, when the solution management system 406 receives updated or new vendor solutions 418 from the vendor websites 416, the solution selection logic 424 may not re-determine or refresh the locked vendor solution as the user has indicated that it should be the selected solution for the given vulnerability 410 or vulnerable item 412.

Additionally or alternatively, the solution management system 406 may include user preference logic 428 that enables a user to indicate preferences for branches (e.g., paths of divergence) and/or vendor solutions 418 (e.g., user-preferred branches and/or user-preferred vendor solutions) in the solution graph 422. For example, in some embodiments, solution display logic 430 may display a list of vendor solutions 418 for the user to view (e.g., on the client device 20 via the network 14) that remediate a selected vulnerability 410 or vulnerable item 412. The list may include any suitable details relevant to facilitate selecting a vendor solution 418 to remediate one or more vulnerabilities 410 or vulnerable items 412. As an illustrative example, FIG. 10 is an example user interface 900 that displays a table 902 of vendor solutions 418, according to embodiments of the present disclosure. The solution display logic 430 may display the table 902 on a display of the client device 20. The table 902 provides information associated with the vendor solutions 418 that may facilitate selecting a vendor solution 418 to remediate one or more vulnerabilities 410 or vulnerable items 412, including a descriptive summary or title 904 of the vendor solution 418, a bulletin 906 of the vendor solution 418 that may describe how the vendor solution 418 was provided or the source from which the vendor solution 418 was supplied from, a product category 908 associated with the product for which the vendor solution 418 was provided, a risk score 910 representing a risk to the client network 12 and/or client devices 20 when not implementing the vendor solution 418, a risk rating 912 representing an alternative scale to evaluate the risk to the client network 12 and/or client devices 20 when not implementing the vendor solution 418, a number 914 of active vulnerable items 412 that may be remediated when implementing the vendor solution 418, a percent complete 916 associated with the number of vulnerable items 412 already remediated compared to the number of total vulnerable items 412 that may be remediated by the vendor solution 418, and a date published 918 associated with when the vendor solution 418 was published. It should be understood that the table 902 may also list any other suitable information that may facilitate selecting a vendor solution 418 to remediate one or more vulnerabilities 410 or vulnerable items 412.

From the table 902, the user may select a vendor solution 418 to remediate a certain vulnerability 410 or vulnerable item 412, or allow the solutions selection logic 424 to select or suggest a vendor solution. In the cases in which the user selects a vendor solution 418, the user preference logic 428 may enable the user to set a user-favored solution that may be used by the solution selection logic 424 when determining a vendor solution. As such, the solution selection logic 424 may only travel the branch of the solution graph 422 where the user-favored solution exists when determining subsequent vendor solutions.

The user may favor some branches and/or vendor solutions 418 to others because, for example, the favored branches and/or vendor solutions 418 have more beneficial impact on the client network 12 and/or client devices 20, expose the client network 12 and/or client devices 20 to less risk, are less costly to implement, take less time to implement, and so on. For instance, in a solution graph 422, one branch may resolve a vulnerability 410 by installing a newer major version of software, while another branch may patch an older major version of the software which the user may desire to keep using. As such, the user may set a preference for the branch that patches the older major version of the software so that the client network 12 and/or client devices 20 may continue using the older major version of the software. In some embodiments, the user preference logic 428 may use machine learning techniques to determine user preferences of branches and/or vendor solutions 418 in the solution graph 422.

In some embodiments, the client instance may enable groupings of vulnerable items 412 ("vulnerable item groups"). For example, a user may select and group together multiple vulnerable items 412 into a vulnerable item group. The user preference logic 428 may treat user preferences of branches and/or vendor solutions 418 for the vulnerable items 412 in the vulnerable item group collectively. That is, the user preference logic 428 may roll up user preferences of the vulnerable items 412 in the vulnerable item group up to the level of the vulnerable item group, and may facilitate selecting or displaying vendor solutions based on or that fit the user preferences.

Turning back to the system 400 illustrated in FIG. 5, to facilitate selecting a vendor solution 418 to remediate one or more vulnerabilities 410 or vulnerable items 412, the solution management system 406 may include solution analysis logic 432 that may facilitate determining solutions of high value and vulnerability exposure of the client network 12 and/or client devices 20, as well as track the potential and progress of remediation of vulnerabilities 410 resolved by the vendor solutions 418. For example, the solution analysis logic 432 may determine the number of total vulnerable items 412 that have been and/or may be remediated by each vendor solution 418, an active number of vulnerable items 412 that may be (but not yet) remediated by each vendor solution 418, a number of vulnerable items 412 that already have been remediated by each vendor solution 418, a percentage of the active number of vulnerable items 412 that may be (but not yet) remediated by each vendor solution 418 to the number of total vulnerable items 412 that have been and/or may be remediated by each vendor solution 418, and so on. As previously discussed, at least some of these results may be displayed by the solution display logic 430 in the table 902 shown in FIG. 10.

The solution analysis logic 432 may determine the number of distinct configuration items 402 associated with vulnerable items 412 that may be remediated by a selected or favored vendor solution 418, which may indicate the number of devices and/or assets of the client network 12 and/or client devices 20 that may be impacted by implementing the vendor solution 418. During implementation of the vendor solution 418, the solution analysis logic 432 may also or alternatively determine the number of distinct configuration items 402 that are associated with remediated vulnerable items 412, the number of distinct configuration items 402 that are associated with vulnerable items 412 that are not yet remediated but may be remediated by the vendor solution 418, and a percent of distinct configuration items 402 remediated to indicate the progress of implementing the vendor solution 418.

In some embodiments, the solution management system 406 may enable users to defer or not apply a vendor solution 418 to selected configuration items 402 and/or vulnerable items 412. This may be because, for example, the configuration items 402 and/or vulnerable items 412 are currently being used, and the users do not desire for changes to be made to the configuration items 402 and/or vulnerable items 412 at the current time. As a result, the solution analysis logic 432 may take the deferred configuration items 402 and/or vulnerable items 412 into account when generating the numbers of configuration items 402 and/or vulnerable items 412 remediated, to be remediated, and so on.

The solution analysis logic 432 may additionally or alternatively determine "potential solution targets", which refer to vulnerabilities 410 and/or vulnerable items 412 that may be resolved by a vendor solution 418 indirectly (e.g., through supersedence and/or inheritance as opposed to the vendor solution 418 being selected to directly apply to a targeted vulnerability 410 and/or vulnerable item 412). A vendor solution's potential vulnerability targets, vulnerable item targets, and/or configuration item targets, may facilitate determining the impact of the vendor solution 418 across the client network 12 and/or client devices 20, and, consequently, the most impactful vendor solution 418 from a set of potentially selectable vendor solutions 418.

Figure 11:
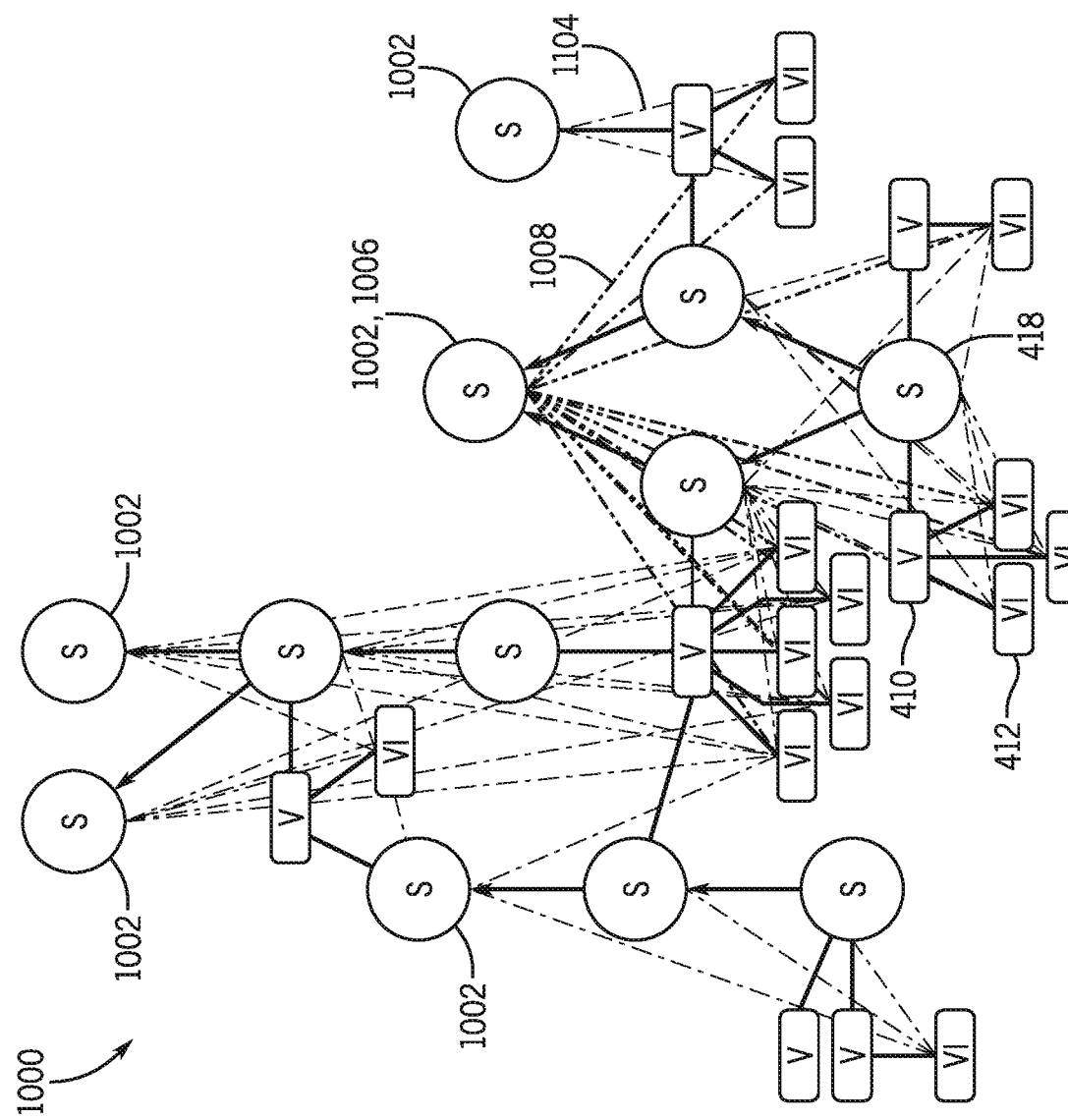
FIG. 11 is an example solution graph illustrating impact and interrelationships of vendor solutions, according to embodiments of the present disclosure.

FIG. 11 is an example solution graph 1000 illustrating impact and/or interaction of vendor solutions 418, according to embodiments of the present disclosure. In particular, the solution graph 1000 illustrates or conceptualizes relationships between vendor solutions 418, vulnerabilities 410 remediated by the vendor solutions 418, and vulnerable items 412 associated with the vulnerabilities 410 (e.g., configuration items 402 having the vulnerabilities 410). The solution analysis logic 432 may determine the most impactful vendor solutions 1002 for each vulnerable item 412. That is, each most impactful vendor solution 1002 may remediate the largest number of vulnerable items 412 for a target vulnerable item 412, as illustrated by the dashed-and-dotted lines indicating potential solution relationships 1004. In some embodiments, the solution analysis logic 432 may determine the most impactful vendor solution 1006 for the entire solution graph 1000, which remediates the largest number of vulnerable items 412 in the solution graph 1000, as illustrated by the dashed-and-double-dotted lines indicating most impactful solution relationships 1008.

Turning back to FIG. 5, the solution management system 406 may include solution risk evaluation logic 434 that may score, tabulate, rate, or otherwise evaluate the risk of not implementing vendor solutions 418 on the client network 12 and/or client devices 20. That is the solution risk evaluation logic 434 may determine a risk to the client network 12 and/or client devices 20 of the vulnerabilities 410 that may be remediated by a vendor solution 418. In some embodiments, the risk may be provided on a scale of 0-100, where a high risk score indicates a high level of risk that deploying a vendor solution 418 would alleviate from the client network 12 and/or client devices 20. For example, the solution risk evaluation logic 434 may calculate the risk score based on an 85% weight attributable to a maximum risk of a vulnerable item 412 and the remaining 15% weight attributable to a logarithmic scale of a number of total active vulnerable items 412 that may be remediated by implementing the vendor solution 418. This calculation is provided as an example, and it should be understood that any suitable routine(s) for determining risk alleviated by a vendor solution 418 is contemplated. As previously discussed the risk score (e.g., 910) may be displayed by the solution display logic 430 in the table 902 shown in FIG. 10.

Additionally or alternatively, the solution risk evaluation logic 434 may determine a risk rating that scales the risk score from 1-5 (corresponding to Critical, High, Medium, Low, and None). The risk rating may enable users to quickly evaluate the risk of vendor solutions 418 at a glance. As previously discussed the risk rating (e.g., 912) may be displayed by the solution display logic 430 in the table 902 shown in FIG. 10.

Figure 12:
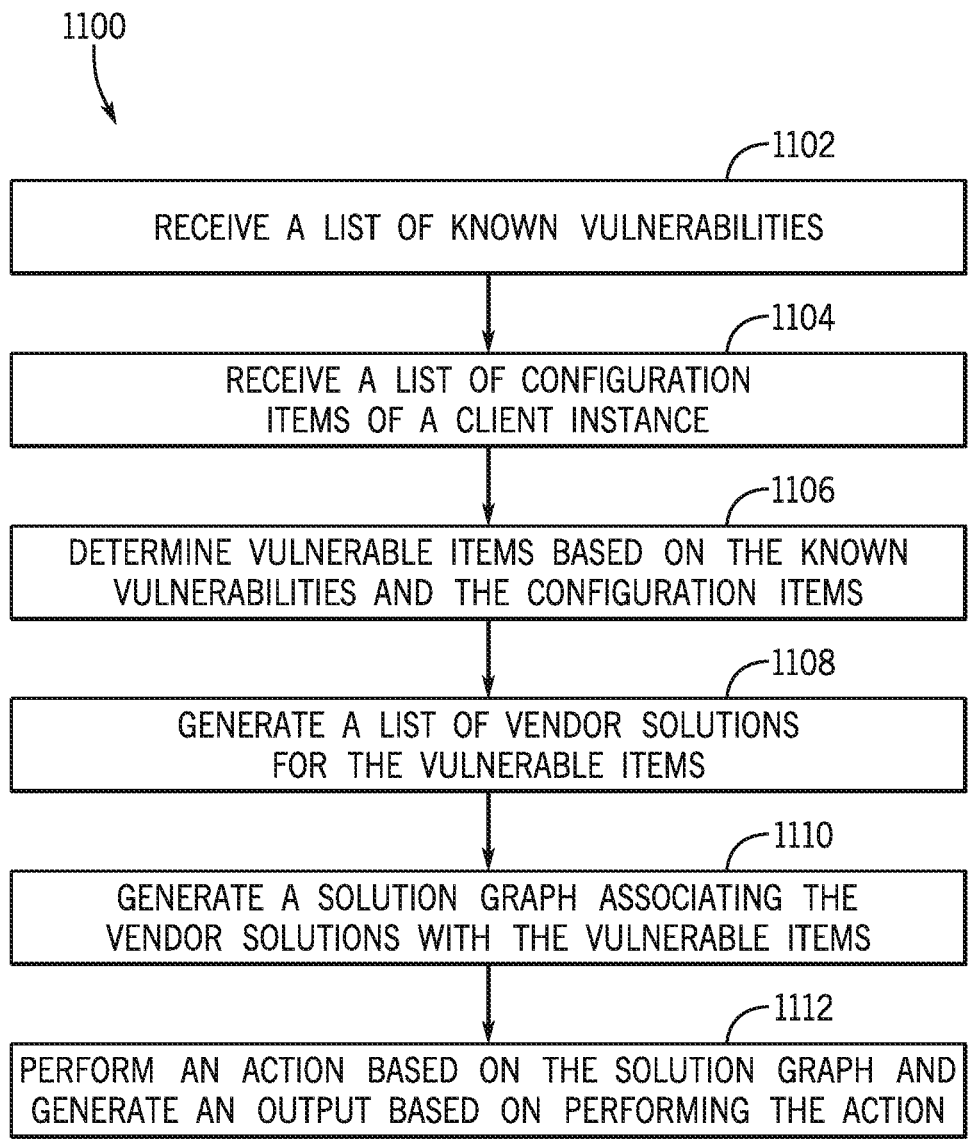
FIG. 12 is a flow diagram illustrating a process for managing vendor solutions to remediate vulnerabilities and/or vulnerable items, according to embodiments of the present disclosure.

With the foregoing in mind, FIG. 12 is a flow diagram illustrating a process 1100 for managing vendor solutions 418 to remediate vulnerabilities 410 and/or vulnerable items 412, according to embodiments of the present disclosure. The process 1100 may be performed, for example, by the system 400 of FIG. 5, and, more particularly, the client instance 102, the configuration item vulnerability scanning logic 411, and/or the solution management system 406. While the process 1100 is described using steps in a specific sequence, it should be understood that the present disclosure contemplates that the describe steps may be performed in different sequences than the sequence illustrated, and certain described steps may be skipped or not performed altogether.

In process block 1102, the solution management system 406 receives a list of known vulnerabilities 410. In particular, the solution management system 406 may communicatively couple to the known vulnerabilities database 408 via, for example, the network 14, as shown in FIG. 5. The known vulnerabilities database 408 may include a list of cybersecurity vulnerabilities 410, which may be downloaded and/or accessed by the solution management system 406.

In process block 1104, the solution management system 406 receives a list of configuration items 402 of a client network 12 and/or client devices 20. In particular, the solution management system 406 may communicatively couple to a configuration management database (CMDB) 404 that manages the configuration items 402 by storing configurations, attributes, descriptions, and/or any other suitable information associated with the configuration items 402. As such, the solution management system 406 may receive a list of the configuration items 402 of the client network 12 and/or client devices 20 from the CMDB 404.

In process block 1106, the configuration item vulnerability scanning logic 411 determines vulnerable items 412 based on the known vulnerabilities 410 and the configuration items 402. In particular, the solution management system 406 may be communicatively coupled to a configuration item vulnerability scanning logic 411, as illustrated in FIG. 5, may scan the configuration items 402 of the client network 12 and/or client devices 20, and determine the configuration items 402 that are associated with and/or have the known vulnerabilities 410. The determined vulnerable items 412 may be stored in a vulnerable items database 414.

In process block 1108, the solution management system 406 generates or receives a list of vendor solutions 418 for the vulnerable items 412. In particular, the solution management system 406 may communicatively couple to various vendor websites (or other sites or repositories) 416 via the network 14, as shown in FIG. 5. The vendor websites 416 may provide vendor solutions 418 to the known vulnerabilities 410 listed in the known vulnerabilities database 408. As such, the solution management system 406 may download or access the list of vendor solutions 418 from the vendor websites 416.

In process block 1110, the solution management system 406 generates a solution graph 422 associating the vendor solutions 418 with the vulnerable items 412. In particular, as previously discussed, the solution graph generation logic 420 may generate the solution graph 422 which illustrates or conceptualizes relationships between the vendor solutions 418 that apply to the vulnerable items 412. As an example, FIG. 13 below is a flow diagram illustrating a process 1200 for generating the solution graph 422, according to embodiments of the present disclosure.

In process block 1112, the solution management system 406 performs an action based on the solution graph 422 and generates an output based on performing the action. For example, as shown in FIG. 5, the solution selection logic 424 may display and/or select a vendor solution to implement based on superseding vendor solutions. As another example, the solution locking logic 426 may enable a user to "lock" or force a vendor solution 418 to remediate a given vulnerability 410 or vulnerable item 412, and/or select or enable selection of a displayed vendor solution 418 to implement. The user preference logic 428 may enable a user to indicate preferences for branches (e.g., paths of divergence) and/or vendor solutions 418 in the solution graph 422, and select a vendor solution 418 to implement based on the user preferences. The solution display logic 430 may list of vendor solutions 418 for the user to view (e.g., on the client device 20 via the network 14) that remediate a selected vulnerability 410 or vulnerable item 412, and/or enable selection of a displayed vendor solution 418 to implement. The solution analysis logic 432 may determine impact of each vendor solution 418 and/or the most impactful vendor solution 418 (e.g., for a selected vulnerability 410 or vulnerable item 412), and/or select or enable selection of the most impactful vendor solution 418 to implement. The solution risk evaluation logic 434 may determine a risk of not implementing certain vendor solutions 418 on the client network 12 and/or client devices 20, and/or select or enable selection of the vendor solution 418 that alleviates the most risk to implement. In this manner, the process 1100 may manage vendor solutions 418 to remediate vulnerabilities 410, vulnerable items 412, and/or vulnerable item groups.

Figure 13:
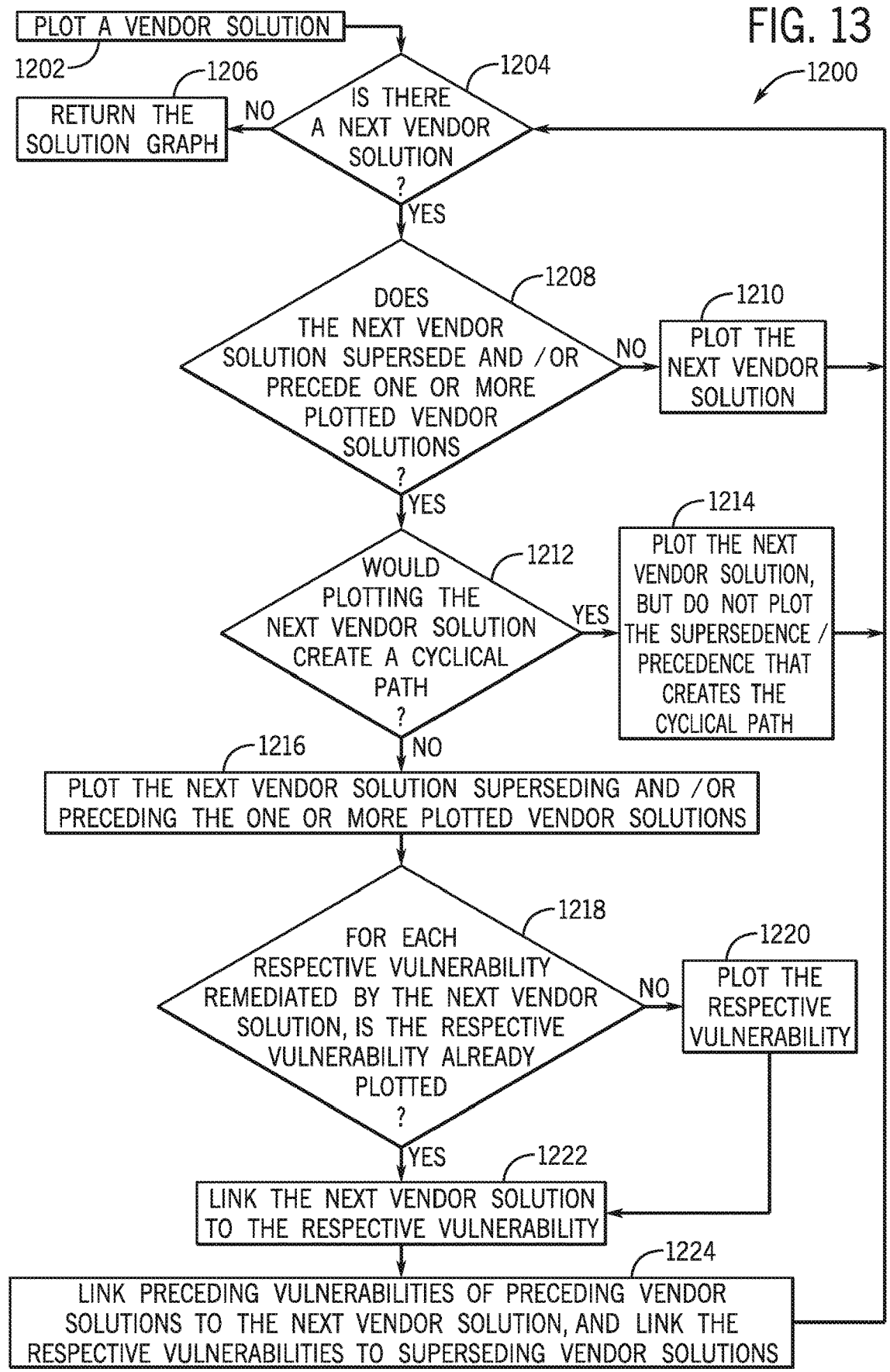
FIG. 13 is a flow diagram illustrating a process for generating a solution graph, according to embodiments of the present disclosure.

As mentioned above with respect to process block 1110, the solution graph generation logic 420 may generate the solution graph 422 which illustrates or conceptualizes relationships between the vendor solutions 418 that apply to the vulnerable items 412. FIG. 13 is a flow diagram illustrating a process 1200 for generating the solution graph 422, according to embodiments of the present disclosure. The process 1200 may be performed, for example, by the system 400 of FIG. 5, and, more particularly, the solution graph generation logic 420 of the solution management system 406. While the process 1200 is described using steps in a specific sequence, it should be understood that the present disclosure contemplates that the described steps may be performed in different sequences than the sequence illustrated, and certain described steps may be skipped or not performed altogether.

In process block 1202, the solution graph generation logic 420 plots a vendor solution 418. In particular, the vendor solution 418 may be one of the vendor solutions 418 identified from the vendor websites 416 (e.g., in process block 1108 of the process 1100 of FIG. 12) and remediate one of the vulnerable items 412 of the client network 12 and/or client devices 20 (e.g., as determined in process block 1106 of the process 1100 of FIG. 12 and stored in the vulnerable items database 414). An example of plotting the vendor solution 418 may be viewed in the example solution graphs 500, 600, 700 of FIGS. 6-8.

In decision block 1204, the solution graph generation logic 420 determines whether there is a next vendor solution 418. For example, the solution graph generation logic 420 may determine whether there is another vendor solution 418 to plot in the solution graph 422 in the list of vendor solutions received from the vendor websites 416 (e.g., in process block 1108 of the process 1100 of FIG. 12).

If there is no next vendor solution 418, then all vendor solutions 418 have been plotted, and in process block 1206, the solution graph generation logic 420 returns the solution graph 422. If there is a next vendor solution 418, then in decision block 1208, the solution graph generation logic 420 determines whether the next vendor solution 418 supersedes and/or precedes one or more plotted vendor solutions 418. If the next vendor solution 418 does not supersede and/or precede a plotted vendor solution 418, then in process block 1210, the solution graph generation logic 420 plots the next vendor solution 418, and returns to decision block 1204 to determine whether there is another vendor solution 418 to plot.

If the next vendor solution 418 supersedes and/or precedes a plotted vendor solution 418, then in decision block 1212, the solution graph generation logic 420 determines whether plotting the next vendor solution 418 would create a cyclical path. This is because cyclical paths, where a supersedence path may pass through and return to a single vendor solution 418, may prevent determination of a solution 418 due to endless traveling in the cyclical path or loop. If plotting the next vendor solution 418 would create a cyclical path, then, in process block 1214, the solution graph generation logic 420 plots the next vendor solution 418, but does not plot the supersedence/precedence that creates the cyclical path. That is, the solution graph generation logic 420 may not link the next vendor solution 418 to other plotted vendor solutions 418 (and associated vulnerabilities 410) that would result in a cyclical path, thus avoiding a cyclical path in the solution graph 422. The process 1200 then returns to decision block 1204 to determine whether there is another vendor solution 418 to plot.

If plotting the next vendor solution 418 would not create a cyclical path, then, in process block 1216, the solution graph generation logic 420 plots the next vendor solution 418 superseding and/or preceding the one or more plotted vendor solutions 418. For example, as shown in the example solution graph 500 of FIG. 6, the solution graph generation logic 420 plots the vendor solution 506 as superseding the vendor solution 504 using an arrow 502 pointing to the superseding vendor solution 506.

In decision block 1218, the solution graph generation logic 420 determines whether, for each respective vulnerability 410 remediated by the next vendor solution 418, the respective vulnerability 410 is already plotted. If not, then in process block 1220, the solution graph generation logic 420 plots the respective vulnerability 410. For example, as shown in the example solution graph 600 of FIG. 7, the solution graph generation logic 420 plots the vulnerabilities 608, 610 remediated by the vendor solution 604.

Then, or if the solution graph generation logic 420 determines that the respective vulnerability 410 is already plotted, in process block 1222, the solution graph generation logic 420 links the next vendor solution 418 to the respective vulnerability 410. For example, as shown in the example solution graph 600 of FIG. 7, the solution graph generation logic 420 links the vulnerabilities 608, 610 to the vendor solution 604 (via the solid lines 612).

In process block 1224, the solution graph generation logic 420 links vulnerabilities 410 that are remediated by vendor solutions 418 that precede the next vendor solution 418 (referred to herein as "preceding vulnerabilities") to the next vendor solution 418, and links the respective vulnerabilities 410 of the next vendor solution 418 to superseding vendor solutions 418. In particular, the preceding vendor solutions 418 are those vendor solutions 418 that are superseded by the next vendor solution 418, whose relationships to the next vendor solution 418 were plotted in process block 1216. For example, as shown in the example solution graph 600 of FIG. 7, for the vendor solution 604, the solution graph generation logic 420 links the preceding vulnerability 606 of the preceding vendor solution 602 to the vendor solution 604 (via the dashed line 614). Similarly, for the vendor solution 602, the solution graph generation logic 420 links the respective vulnerability 606 to the superseding vendor solution 604 of the vendor solution 602 (via the dashed line 614). In this manner, the process 1200 may generate the solution graph 422.

Moreover, in some embodiments, a user may "lock" or force a vendor solution 418 to remediate a given vulnerability 410 or vulnerable item 412 (e.g., via the solution locking logic 426 of the solution management system 406). In such a case, the solution graph generation logic 420 may skip certain steps of the process 1200, such as linking vulnerabilities 410 to vendor solutions 418 in process blocks 1222 and/or 1224 if the vulnerabilities 410 include the given vulnerability 410, as the user has indicated that it should be a selected or favored vendor solution 418 that should be implemented for the given vulnerability 410. Moreover, locking vulnerabilities 410 may be independently applied to locking vulnerable items 412. For example, the solution locking logic 426 may lock a vulnerability 410 to a particular vendor solution 418, while locking a vulnerable item 412 that is associated with the vulnerability 410 to a different vendor solution 418 than the vulnerability 410 is locked.

Figure 14:
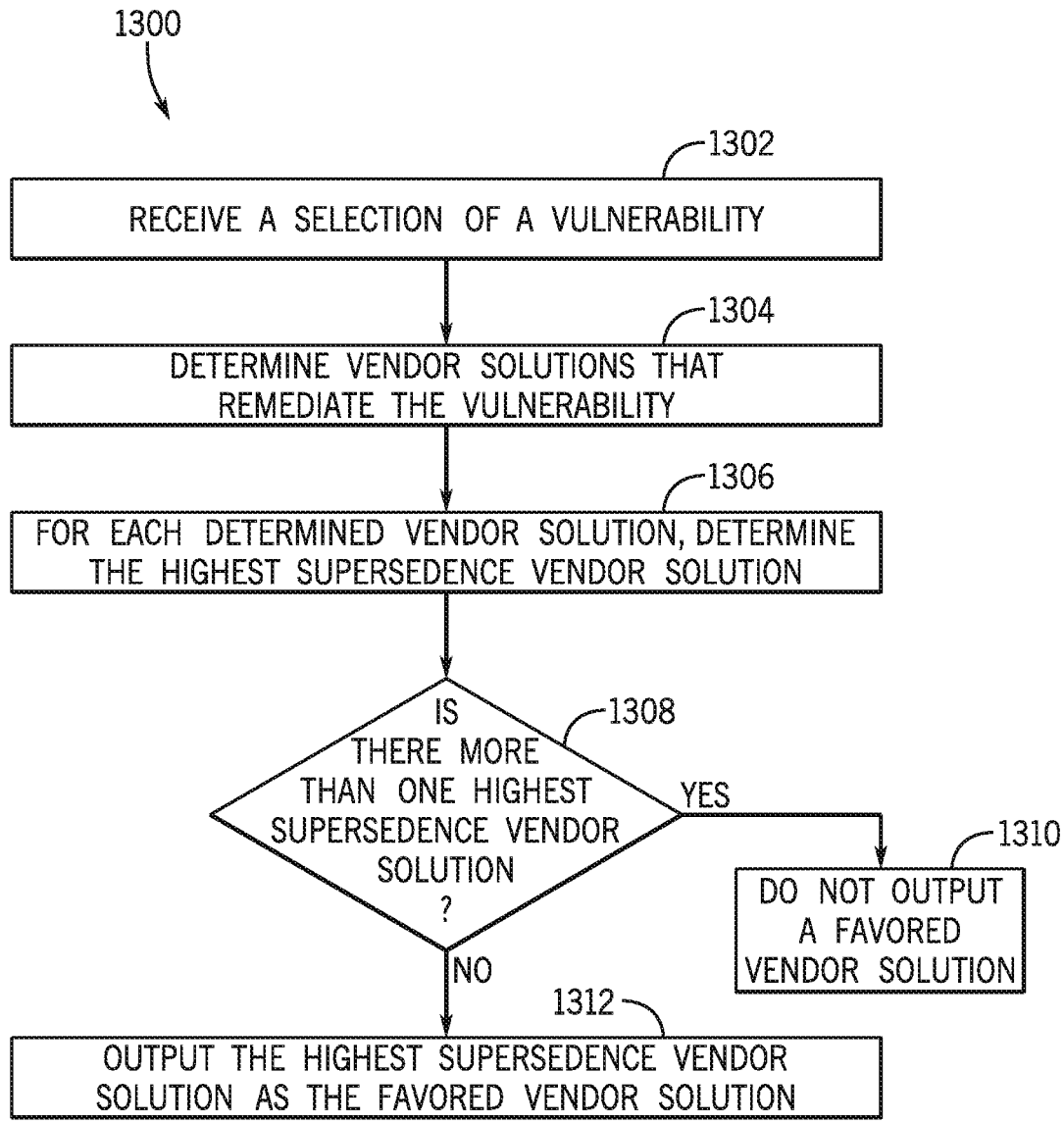
FIG. 14 is a flow diagram illustrating a process for selecting a vendor solution, according to embodiments of the present disclosure.

As mentioned above with respect to process block 1112, the solution selection logic 424 may select a vendor solution using the solution graph 422 and based on superseding vendor solutions. FIG. 14 is a flow diagram illustrating a process 1300 for selecting a vendor solution, according to embodiments of the present disclosure. The process 1300 may be performed, for example, by the system 400 of FIG. 5, and, more particularly the solution selection logic 424 of the solution management system 406. While the process 1300 is described using steps in a specific sequence, it should be understood that the present disclosure contemplates that the describe steps may be performed in different sequences than the sequence illustrated, and certain described steps may be skipped or not performed altogether.

In process block 1302, the solution selection logic 424 receives a selection of a vulnerability 410. In particular, the solution selection logic 424 may enable a user to select a vulnerability 410 (or a vulnerable item 412).

In process block 1304, the solution selection logic 424 determines one or more vendor solutions 418 that remediate the selected vulnerability 410. As mentioned previously with respect to process block 1108 of FIG. 12, the solution management system 406 receives a list of vendor solutions 418 for the vulnerable items 412 of the client network 12 and/or client devices 20. As such, the solution selection logic 424 may determine those vendor solutions 418 on the list of vendor solutions 418 that remediate the selected vulnerability 410.

In process block 1306, for each determined vendor solution 418, the solution selection logic 424 determines the highest supersedence vendor solution. For example, the solution graph 800 of FIG. 9 illustrates multiple favored vendor solutions 802, 804, 806, 808 for respective given vulnerabilities 812, 814, 816, 818 because the solution selection logic 424 may identify, assign, or output each of the multiple vendor solutions 802, 804, 806, 808 as a highest supersedence vendor solution for the respective given vulnerabilities 812, 814, 816, 818. However, for each of the other illustrated vulnerabilities (e.g., 820), there are more than one highest supersedence vendor solution (e.g., 824).

In decision block 1308, the solution selection logic 424 determines whether there is more than one highest supersedence vendor solution for the selected vulnerability 410. In particular, and as shown in the example solution graph 800 of FIG. 9, for each of the vendor solutions 418 that remediate a vulnerability 410, the solution selection logic 424 may follow the direction of supersedence arrows connected to a respective vendor solution 418 (and does not follow the paths to any vulnerabilities 410). The solution selection logic 424 may determine whether following the paths of each vendor solution 418 that remediates the vulnerability 410 ultimately leads to more than one vendor solution 418.

If the solution selection logic 424 determines that there is more than one highest supersedence vendor solution for the selected vulnerability 410, then in process block 1310, the solution selection logic 424 does not output a suggested or favored vendor solution, as it may be ambiguous what the suggested or favored vendor solution is. As an example, for each of the vulnerabilities 820 of the solution graph 800 of FIG. 9, there is more than one highest supersedence vendor solution (e.g., 824). As such, the solution selection logic 424 does not output a vendor solution if the user selects one of the vulnerabilities 820. Instead, the solution selection logic 424 may output an indication (e.g., an error message indicating) that there is no single favored vendor solution. In some embodiments, though, the solution selection logic 424 may return all applicable vendor solutions 418 (including an indication of which of the vendor solutions 418 are of highest supersedence), the highest supersedence vendor solutions, or a subset of the applicable vendor solutions 418 based on any suitable metrics or user preferences. This may be for the user to view and choose a vendor solution from the multiple identified vendor solutions to implement. Additionally, if the solution selection logic 424 determines that there is not a favored or suggested vendor solution due to updated or new data from a solution import from the vendor websites 416, and the solution selection logic 424 had previously determined that there was a favored vendor solution based on older data, then the solution selection logic 424 may remove or delete the previously determined favored vendor solution so that information may stay current.

If the solution selection logic 424 determines that there is only one highest supersedence vendor solution for the selected vulnerability 410, then in process block 1312, the solution selection logic 424 outputs the highest supersedence vendor solution. For example, referring back to FIG. 9, for the vulnerability 814, there is only one highest supersedence vendor solution (e.g., 804). As such, the solution selection logic 424 outputs a highest supersedence vendor solution 804 as the favored or suggested vendor solution. In this manner, the process 1300 selects and/or enables selection of a vendor solution to implement.

In additional or alternative embodiments, user preference logic 428 of the solution management system 406 may enable a user to indicate preferences for branches (e.g., paths of divergence) and/or vendor solutions 418 in the solution graph 422. For example, the user may indicate a preference for a vendor solution 418, and the solution selection logic 424 may only travel the branch of the solution graph 422 where the user-favored solution exists when determining favored or suggested vendor solutions.

The user may favor some branches and/or vendor solutions 418 to others because, for example, the favored branches and/or vendor solutions 418 have more beneficial impact on the client network 12 and/or client devices 20, expose the client network 12 and/or client devices 20 to less risk, are less costly to implement, take less time to implement, and so on. For instance, in a solution graph 422, one branch may resolve a vulnerability 410 by installing a newer major version of software, while another branch may patch an older major version of the software which the user may desire to keep using. As such, the user may set a preference for the branch that patches the older major version of the software so that the client network 12 and/or client devices 20 may continue using the older major version of the software. In some embodiments, the user preference logic 428 may use machine learning techniques to determine user preferences of branches and/or vendor solutions 418 in the solution graph 422.

It should be understood that the term "logic" as used in the present disclosure, and indeed all components of the system 400, may be implemented in software (e.g., machine-readable and/or processor-executable instructions, including firmware), hardware (e.g., circuitry), or both.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A cloud computing system comprising:
one or more data centers;
a client instance hosted by the one or more data centers;
a communication network accessible by the client instance;
one or more client devices accessing the client instance;
one or more client networks enabling communication with the client instance by the one or more client devices via the communication network, wherein the one or more client devices and the one or more client networks comprise a plurality of configuration items;
a vulnerabilities database communicatively coupled to the client instance, wherein the vulnerabilities database stores a list of vulnerabilities associated with configuration items of the plurality of configuration items; and
one or more vendor web sites communicatively coupled to the client instance via the communication network, wherein the one or more vendor websites provide vendor solutions to vulnerabilities present on the list of vulnerabilities associated with the configuration items of the plurality of configuration items;
wherein the client instance comprises solution graph generation logic configured to generate a solution graph associating the vendor solutions with respective vulnerabilities addressed by each vendor solution of the vendor solutions and update only a portion of the solution graph associated with new vendor solutions in response to receiving the new vendor solutions, wherein the client instance comprises solution risk evaluation logic configured to evaluate respective risks associated with not implementing each vendor solution of the vendor solutions in the solution graph, and wherein the client instance is configured to implement a first vendor solution of the vendor solutions in response to determining that a first risk of not implementing the first vendor solution is higher than a second risk of not implementing a second vendor solution of the vendor solutions.

2. The cloud computing system of claim 1, wherein the respective risks are associated with the respective vulnerabilities addressed by respective vendor solutions of the vendor solutions.

3. The cloud computing system of claim 1, wherein the solution risk evaluation logic is configured to provide respective risk scores associated with the respective risks based on:
   a maximum risk of a vulnerability; and
   a number of vulnerabilities that a vendor solution is configured to remediate.

4. The cloud computing system of claim 1, wherein a remaining portion of the solution graph is unchanged prior to and after updating only the portion of the solution graph associated with the new vendor solutions.

5. A tangible, non-transitory, machine-readable-medium, comprising machine-readable instructions that, when executed by a processor, cause the processor to perform acts comprising:
   generate a solution graph associating vendor solutions with a plurality of vulnerabilities of a plurality of configuration items, wherein one or more client networks, one or more client devices communicatively coupled to the one or more client networks, or both, comprise the plurality of configuration items;
   update only a portion of the solution graph associated with new vendor solutions in response to receiving the new vendor solutions;
   evaluate respective risks associated with not implementing each vendor solution of the vendor solutions in the solution graph; and
   implement a first vendor solution of the vendor solutions in response to determining that a first risk of not implementing the first vendor solution is higher than a second risk of not implementing a second vendor solution of the vendor solutions.

6. The tangible, non-transitory, machine-readable-medium of claim 5, wherein the machine-readable instructions cause the processor to provide respective risk ratings associated with the respective risks associated with not implementing each vendor solution.

7. The tangible, non-transitory, machine-readable-medium of claim 6, wherein the machine-readable instructions cause the processor to provide the respective risk ratings on a scale of 1 to 5.

8. The tangible, non-transitory, machine-readable-medium of claim 6, wherein the machine-readable instructions cause the processor to transmit a representation of a risk rating of the respective risk ratings to a display device for display.

9. The tangible, non-transitory, machine-readable-medium of claim 5, wherein the machine-readable instructions cause the processor to determine a number of vulnerabilities of the plurality of vulnerabilities associated with the plurality of configuration items that a particular vendor solution of the vendor solutions is configured to remediate and transmit a representation of the number of vulnerabilities to a display device for display.

10. The tangible, non-transitory, machine-readable-medium of claim 5, wherein the machine-readable instructions cause the processor to determine a completion percentage associated with a number of vulnerabilities of the plurality of vulnerabilities associated with the plurality of configuration items that a particular vendor solution of the vendor solutions has remediated compared to a total number of vulnerabilities of the plurality of vulnerabilities that the particular vendor solution is configured to remediate and transmit a representation of the completion percentage to a display device for display.

11. A client instance hosted by one or more data centers, wherein the client instance is configured to:
   communicate with a communication network, wherein the communication network is configured to communicate with one or more client networks, a vulnerabilities database, and one or more vendor websites, wherein the one or more client networks are configured to communicate with one or more client devices, wherein the one or more client networks, the one or more client devices, or both, comprise one or more configuration items, wherein the vulnerabilities database stores a list of vulnerabilities associated with the one or more configuration items, and wherein the one or more vendor websites provide vendor solutions to a plurality of vulnerabilities of the list of vulnerabilities;
   wherein the client instance comprises:
      solution graph generating logic configured to generate a solution graph associating the vendor solutions with respective vulnerabilities of the plurality of vulnerabilities addressed by each vendor solution of the vendor solutions and update only a portion of the solution graph associated with new vendor solutions in response to receiving the new vendor solutions; and
      solution risk evaluation logic configured to evaluate respective risks associated with not implementing each vendor solution of the vendor solutions in the solution graph; and
   wherein the client instance is configured to implement a first vendor solution of the vendor solutions in response to determining that a first risk of not implementing the first vendor solution is higher than a second risk of not implementing a second vendor solution of the vendor solutions.

12. The client instance of claim 11, wherein the respective risks are associated with one or more vulnerabilities of the plurality of vulnerabilities, and wherein each vendor solution of the vendor solutions is configured to remediate the one or more vulnerabilities.

13. The client instance of claim 12, wherein the solution risk evaluation logic is configured to provide a risk score associated with the one or more vulnerabilities.

14. The client instance of claim 13, wherein the risk score is provided on a scale of 1 to 100.

15. The client instance of claim 13, wherein a high risk score indicates a high level of risk of the one or more client networks, the one or more client devices, or both, that would be alleviated by deploying the vendor solution.

16. The client instance of claim 13, comprising solution display logic configured to transmit a representation of the risk score to a display device for display.

* * * * *